United States Patent
Patel et al.

(10) Patent No.: US 10,117,308 B2
(45) Date of Patent: *Oct. 30, 2018

(54) ASSOCIATING INFORMATION WITH AN ASSET OR A PHYSICAL SPACE

(71) Applicant: enLighted, Inc., Sunnyvale, CA (US)

(72) Inventors: Sanjeev Patel, Santa Clara, CA (US);
Gaile Gordon, Palo Alto, CA (US);
Tanuj Mohan, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,179

(22) Filed: Jan. 12, 2017

(65) Prior Publication Data

US 2017/0127372 A1    May 4, 2017

Related U.S. Application Data

(63) Continuation of application No. 14/179,988, filed on Jun. 11, 2016, now Pat. No. 9,585,228, which is a
(Continued)

(51) Int. Cl.
*H05B 37/02* (2006.01)
*H04B 1/3827* (2015.01)
(Continued)

(52) U.S. Cl.
CPC ........ *H05B 37/0218* (2013.01); *G01S 5/0027* (2013.01); *G01S 5/16* (2013.01);
(Continued)

(58) Field of Classification Search
CPC ..... G01S 5/0027; G01S 5/16; H05B 37/0218; H05B 37/0227; H05B 37/0245; H05B 37/0272
See application file for complete search history.

(56) References Cited

U.S. PATENT DOCUMENTS 5,101,141 A    3/1992   Warner et al.
5,179,324 A    1/1993   Audbert
(Continued)

FOREIGN PATENT DOCUMENTS

WO    WO2010079388    7/2010
WO    WO2016-026979   2/2016

OTHER PUBLICATIONS

PCT/US2017/025187, PCT Notification of Transmittal of the International Search Report and the Written Opinion of the International Searching Authority, or the Declaration, dated Jun. 29, 2017, International Filing Date Mar. 30, 2017.
(Continued)

*Primary Examiner* — Alexander H Taningco
*Assistant Examiner* — Kurtis R Bahr
(74) *Attorney, Agent, or Firm* — Brian R. Short

(57) ABSTRACT

Apparatuses, methods, apparatuses and systems for operating a control fixture are disclosed. One method includes generating a sense signal, maintaining a communications link between the control fixture and a network, tracking a location of a first mobile device, identifying the first mobile device being within a threshold distance of a second mobile device or a place, and allowing the first mobile device or a user of the first mobile device to receive information associated with the second mobile device or the physical place, or to provide information to be associated with the second mobile device or the physical place upon identifying the first mobile device to be within the threshold distance of the second mobile device or the place.

20 Claims, 16 Drawing Sheets

Related U.S. Application Data continuation-in-part of application No. 15/089,497, filed on Apr. 2, 2016, now Pat. No. 9,585,227, which is a continuation-in-part of application No. 14/549,830, filed on Nov. 21, 2014, now Pat. No. 9,345,115, which is a continuation-in-part of application No. 13/691,562, filed on Nov. 30, 2012, now Pat. No. 8,994,295.

(51) Int. Cl.
| | | |
|---|---|---|
| *H04W 4/04* | (2009.01) | |
| *H04W 4/02* | (2018.01) | |
| *G01S 5/00* | (2006.01) | |
| *G01S 5/16* | (2006.01) | |
| *H04W 76/25* | (2018.01) | |
| *H04W 4/029* | (2018.01) | |
| *G07C 9/00* | (2006.01) | |
| *H04L 29/08* | (2006.01) | |
| *H04W 12/06* | (2009.01) | |
| *H04W 64/00* | (2009.01) | |

(52) U.S. Cl.
CPC ....... *G07C 9/00007* (2013.01); *H04B 1/3833* (2013.01); *H04L 67/26* (2013.01); *H04W 4/023* (2013.01); *H04W 4/029* (2018.02); *H04W 4/043* (2013.01); *H04W 12/06* (2013.01); *H04W 64/00* (2013.01); *H04W 76/25* (2018.02); *H05B 37/0227* (2013.01); *H05B 37/0245* (2013.01); *H05B 37/0272* (2013.01); *Y02B 20/46* (2013.01); *Y02D 70/00* (2018.01); *Y02D 70/142* (2018.01); *Y02D 70/144* (2018.01); *Y02D 70/162* (2018.01); *Y02D 70/164* (2018.01)

(56) References Cited

U.S. PATENT DOCUMENTS

| | | | |
|---|---|---|---|
| 5,191,265 A | 3/1993 | D'Aleo et al. | |
| 5,283,516 A | 2/1994 | Lohoff | |
| 5,668,446 A | 9/1997 | Baker | |
| 5,812,422 A | 9/1998 | Lyons | |
| 5,962,989 A | 10/1999 | Baker | |
| 5,971,597 A | 10/1999 | Baldwin et al. | |
| 6,057,654 A | 5/2000 | Cousy et al. | |
| 6,188,181 B1 | 2/2001 | Sinha et al. | |
| 6,285,912 B1 | 9/2001 | Ellison et al. | |
| 6,342,994 B1 | 1/2002 | Cousy et al. | |
| 6,492,897 B1 | 12/2002 | Mowery, Jr. | |
| 6,548,967 B1 | 4/2003 | Dowling et al. | |
| 6,763,013 B2 | 7/2004 | Kennedy | |
| 6,786,954 B1 | 9/2004 | Lee et al. | |
| 6,909,921 B1 | 6/2005 | Bilger | |
| 7,045,968 B1 | 5/2006 | Bierman et al. | |
| 7,047,092 B2 | 5/2006 | Wimsatt | |
| 7,164,972 B2 | 1/2007 | Imhof et al. | |
| 7,167,094 B2 | 1/2007 | Ciarcia et al. | |
| 7,190,126 B1 | 3/2007 | Paton | |
| 7,297,929 B2 | 11/2007 | Cernasov et al. | |
| 7,309,965 B2 | 12/2007 | Dowling et al. | |
| 7,309,985 B2 | 12/2007 | Eggers et al. | |
| 7,345,998 B2 | 3/2008 | Cregg et al. | |
| 7,348,736 B2 | 3/2008 | Piepgras et al. | |
| 7,437,596 B2 | 10/2008 | McFarland | |
| 7,382,271 B2 | 12/2008 | McFarland | |
| 7,468,666 B2 | 12/2008 | Clarcia et al. | |
| 7,550,931 B2 | 6/2009 | Lys et al. | |
| 7,566,137 B2 | 7/2009 | Veskovic | |
| 7,623,042 B2 | 11/2009 | Huizenga | |
| 7,626,339 B2 | 12/2009 | Paton | |
| 7,664,574 B2 | 2/2010 | Imhof et al. | |
| 7,788,189 B2 | 8/2010 | Budike, Jr. | |
| 7,792,956 B2 | 9/2010 | Choong et al. | |
| 7,812,543 B2 | 10/2010 | Budike, Jr. | |
| 7,925,384 B2 | 4/2011 | Huizenga et al. | |
| 8,264,168 B2 | 9/2012 | Feri et al. | |
| 8,368,321 B2 | 2/2013 | Chemel et al. | |
| 8,457,793 B2 * | 6/2013 | Golding | H05B 37/00 |
| | | | 700/275 |
| 8,587,225 B2 | 11/2013 | Ashar et al. | |
| 8,712,686 B2 | 4/2014 | Bandyopadhyay et al. | |
| 8,787,944 B2 * | 7/2014 | Smith | H04W 4/029 |
| | | | 455/456.6 |
| 8,796,958 B2 | 8/2014 | Billig et al. | |
| 8,994,295 B2 | 3/2015 | Mohan et al. | |
| 9,006,996 B2 | 4/2015 | Mohan et al. | |
| 9,240,111 B2 | 1/2016 | Scott et al. | |
| 9,345,115 B2 | 5/2016 | Mohan | |
| 9,485,623 B2 | 11/2016 | Smith et al. | |
| 9,544,075 B2 * | 1/2017 | Altman | H04H 60/90 |
| 9,585,227 B2 | 2/2017 | Mohan et al. | |
| 2003/0222587 A1 | 12/2003 | Dowling et al. | |
| 2004/0002792 A1 | 10/2004 | Hoffknecht | |
| 2004/0260427 A1 | 12/2004 | Wimsatt | |
| 2005/0169643 A1 | 8/2005 | Franklin et al. | |
| 2005/0231112 A1 | 10/2005 | Woo et al. | |
| 2005/0278047 A1 | 12/2005 | Ahmed | |
| 2006/0091822 A1 | 5/2006 | Bierman et al. | |
| 2006/0244387 A1 | 11/2006 | Park et al. | |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0120653 A1 | 5/2007 | Paton | |
| 2007/0128889 A1 | 6/2007 | Mayer | |
| 2007/0215794 A1 | 9/2007 | Cernasov et al. | |
| 2007/0291483 A1 | 12/2007 | Lys | |
| 2008/0177994 A1 | 7/2008 | Mayer | |
| 2008/0185597 A1 | 8/2008 | Veskovic et al. | |
| 2008/0185977 A1 | 8/2008 | Veskovic et al. | |
| 2008/0215391 A1 | 9/2008 | Dowling et al. | |
| 2008/0244104 A1 | 10/2008 | Clemente | |
| 2008/0265796 A1 | 10/2008 | Null | |
| 2009/0026966 A1 | 1/2009 | Budde et al. | |
| 2009/0055900 A1 | 2/2009 | Gopalasetty et al. | |
| 2009/0179596 A1 | 7/2009 | Willaert et al. | |
| 2009/0195161 A1 | 8/2009 | Lane et al. | |
| 2009/0222137 A1 | 9/2009 | Berman et al. | |
| 2009/0235077 A1 | 9/2009 | Cam Winget et al. | |
| 2009/0254222 A1 | 10/2009 | Berman et al. | |
| 2009/0267540 A1 * | 10/2009 | Chemel | F21V 29/763 |
| | | | 315/297 |
| 2009/0278479 A1 | 11/2009 | Platner et al. | |
| 2009/0284366 A1 * | 11/2009 | Haartsen | G01S 1/70 |
| | | | 340/531 |
| 2010/0026194 A1 | 2/2010 | Paton | |
| 2010/0026479 A1 * | 2/2010 | Tran | A61B 5/0006 |
| | | | 340/501 |
| 2010/0034386 A1 | 2/2010 | Choong et al. | |
| 2010/0135186 A1 | 6/2010 | Choong et al. | |
| 2010/0264846 A1 | 10/2010 | Chemal et al. | |
| 2010/0270933 A1 | 10/2010 | Chemal et al. | |
| 2010/0280677 A1 | 11/2010 | Budike, Jr. | |
| 2010/0295482 A1 | 11/2010 | Chemal et al. | |
| 2010/0301770 A1 * | 12/2010 | Chemel | H05B 37/029 |
| | | | 315/294 |
| 2010/0301776 A1 | 12/2010 | Feri et al. | |
| 2010/0301777 A1 | 12/2010 | Chemal et al. | |
| 2011/0031897 A1 | 2/2011 | Henig et al. | |
| 2011/0093123 A1 | 4/2011 | Alexanian | |
| 2011/0199010 A1 | 8/2011 | Henig et al. | |
| 2011/0199020 A1 | 8/2011 | Henig et al. | |
| 2012/0108294 A1 | 5/2012 | Kaul | |
| 2012/0130632 A1 | 5/2012 | Bandyopadhyay et al. | |
| 2012/0169249 A1 | 7/2012 | Loveland et al. | |
| 2012/0293075 A1 | 11/2012 | Engelen et al. | |
| 2012/0316414 A1 | 12/2012 | Greene | |
| 2013/0102283 A1 | 4/2013 | Lau et al. | |
| 2013/0141554 A1 | 6/2013 | Ganick et al. | |
| 2013/0234607 A1 | 9/2013 | Kim et al. | |
| 2013/0293877 A1 | 11/2013 | Ramer et al. | |

(56) References Cited

U.S. PATENT DOCUMENTS

| | | | |
|---|---|---|---|
| 2014/0285095 A1 | 9/2014 | Chemel et al. | |
| 2014/0313984 A1 | 10/2014 | Diamond et al. | |
| 2015/0008831 A1 | 1/2015 | Carrigan et al. | |
| 2015/0048742 A1 | 2/2015 | Wingren | |
| 2015/0076993 A1 | 3/2015 | Mohan | |
| 2015/0223309 A1 | 8/2015 | Mohan et al. | |
| 2015/0281302 A1 | 10/2015 | Winston et al. | |
| 2016/0122157 A1* | 5/2016 | Keser | B66B 1/468 187/388 |
| 2016/0142877 A1* | 5/2016 | Gujral | H04W 4/70 455/456.1 |
| 2016/0300160 A1 | 10/2016 | Klein | |

OTHER PUBLICATIONS

Notification of Transmittal of the International Search Report and the Written Opinion of the International Searching Authority, of the Declaration, PCT/US/2017/032764, dated Aug. 30, 2017.

* cited by examiner

Receiving, by the light fixture, a broadcast message from a central server, wherein reception of the broadcast message puts the light fixture into a known condition

910

Establishing communication between the light fixture and the user

920

Communicating, by either the light fixture or the user, a location of the user at a time of the established communication, to the central server, thereby allowing the central server to record the location

Generating, by a sensor of the light fixture, a sense signal base on at least one of sensed motion or light
1310

Maintaining a communications link between the light fixture and a network
1320

Managing communication with the network
1330

Managing reception of beacons through the wireless communication circuitry, wherein the beacons are received from an object, and the beacons include information associated with the object
1340

Generating dimming control base on at least one of the sensed signal and communication from the network
1350

Adjusting a dimming control line of a luminaire of the light fixture based on the dimming control
1360

FIGURE 13

ASSOCIATING INFORMATION WITH AN ASSET OR A PHYSICAL SPACE

RELATED APPLICATIONS

This patent application is a continuation of U.S. patent application Ser. No. 15/179,988, filed Jun. 11, 2016, which is a continuation-in-part (CIP) of U.S. patent application Ser. No. 15/089,497, filed Apr. 2, 2016, which is a continuation-in-part (CIP) of U.S. patent application Ser. No. 14/549,830, filed Nov. 21, 2014 and granted as U.S. Pat. No. 9,345,115 on May 17, 2016, which is a continuation-in-part (CIP) of U.S. patent application Ser. No. 13/691,562, filed Nov. 30, 2012 and granted as U.S. Pat. No. 8,994,295 on Mar. 31, 2015, which are herein incorporated by reference.

FIELD OF THE EMBODIMENTS

The described embodiments relate generally to lighting. More particularly, the described embodiments relate to distributed fixtures that control an environment of a structure, and that are operative to associate information with an asset or a physical space.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller. Additionally, centrally-controlled systems are limited in their ability to be scaled. That is, it is not easy to add new lighting devices to a centrally-controlled system.

It is desirable to have a method, system and apparatus for distributed fixtures that control an environment of a structure, and that are operative to associate information with an asset or a physical space.

SUMMARY

One embodiment includes a system operative to associate information with an asset or a physical space. The system includes a plurality of building control fixtures. One or more of the plurality of building fixtures include a sensor unit. The sensor unit includes a sensor, communication circuitry, and a controller. The communication circuitry is operative to maintain a link with a network. The controller is operative to manage communication with the network. At least one of an external controller or at least one controller of the plurality of building fixtures is operative to track a location of a first mobile device, identify the first mobile device being within a threshold distance of a second mobile device or a physical place, and allow the first mobile device or a user of the first mobile device to receive information associated with the second mobile device or the physical place, or to provide information to be associated with the second mobile device or the physical place upon identifying the first mobile device to be within the threshold distance of the second mobile device or the physical place.

Another embodiment includes a method of operating a building control fixture. The method includes generating, by a sensor of the building control fixture, a sense signal, maintaining a communications link between the building control fixture and a network, managing communication with the network, tracking a location of a first mobile device, identifying the first mobile device being within a threshold distance of a second mobile device or a physical place, and allowing the first mobile device or a user of the first mobile device to receive information associated with the second mobile device or the physical place, or to provide information to be associated with the second mobile device or the physical place upon identifying the first mobile device to be within the threshold distance of the second mobile device or the physical place.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method of commissioning a light fixture, according to an embodiment.

FIG. 13 is a flow chart that includes steps of a method of controlling a light fixture, according to another embodiment.

DETAILED DESCRIPTION

Figure 1:
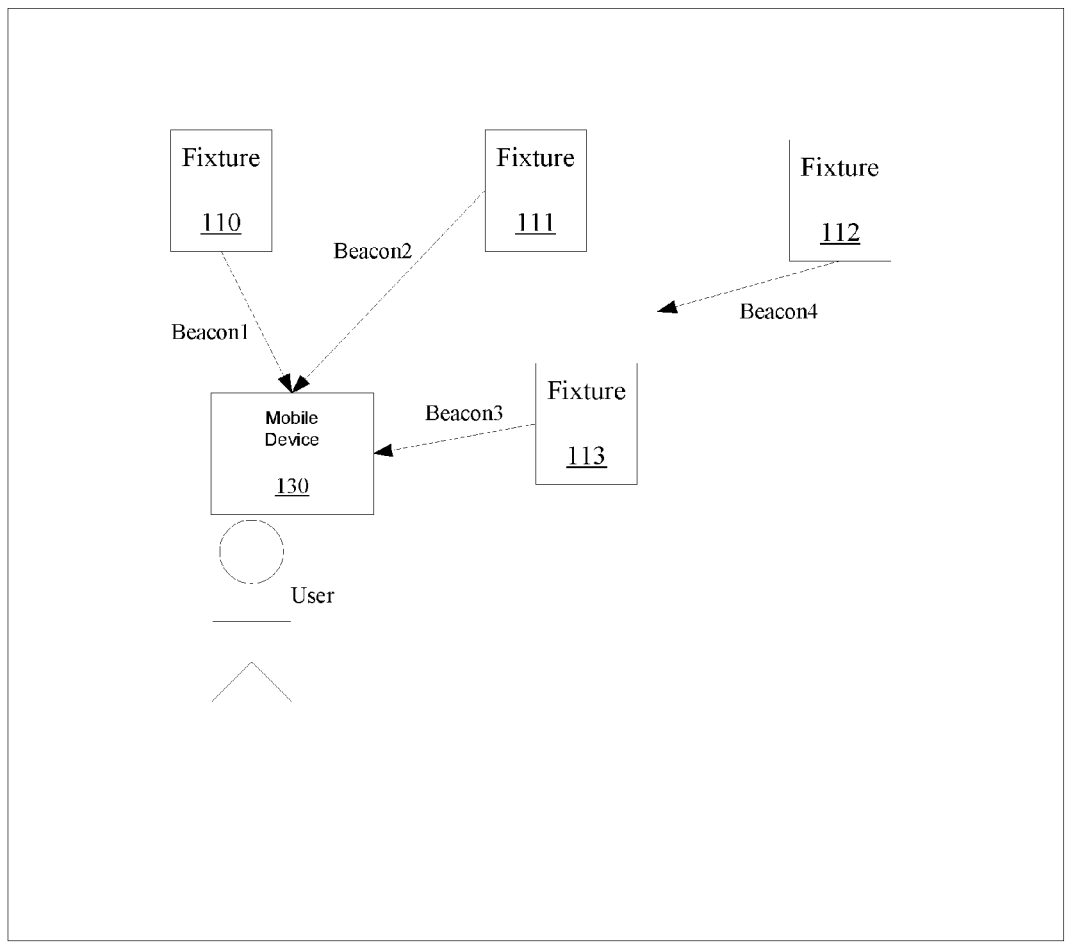
FIG. 1 shows a plurality of light fixtures that transmit beacons that are received by a mobile device, according to an embodiment.

As shown in the drawings, the described embodiments are embodied in an apparatus and method for distributed light fixtures that transmit beacons for reception by an object, or for the distributed light fixtures receiving beacons from the object. For an embodiment, the transmission of the beacons is utilized for location determination of the mobile device and/or the light fixtures.

FIG. 1 shows a plurality of light fixtures that transmit beacons that are received by a mobile device 130, according to an embodiment. More specifically, a subset (110, 111, 113) of the light fixtures 110, 111, 112, 113 transmit beacons that are received by the mobile device 130. The mobile device 130 receives the beacons, and utilizing at least some information included within the beacons, the mobile device 130 estimates at least one of its own location and/or a location of one or more of the light fixtures within a structure 100.

For an embodiment, a power level of signals transmitted from the light fixtures is limited to be less than a threshold. By limiting the power level of the transmitted signals, the distance at which the transmitted signals can be received from a mobile device 130 is limited. For example, for an embodiment, the transmitted signal includes low-power Bluetooth® wireless signals. Due to the transmitted signal being low-power, the mobile device 130 only receive beacons from a light fixture if the mobile device 130 is within a limited range. For an embodiment, the power level of the transmitted signals is set to be at or lower than a threshold amount to ensure that the mobile device is within a specified range of a light fixture in order for the mobile device to receive transmitted beacons. For example, as previously described and shown in FIG. 1, the mobile device 130 may receive beacons transmitted from the light fixtures 110, 111, 113, but may not receive beacon from the fixture 112 because the mobile device 130 is out of range of the fixture 112.

For at least some embodiment, the beacons include identification information that uniquely identifies that light fixture that transmitted the beacon. For an embodiment, the beacons include location information that includes location information of the transmitting light fixture. Based on the identification information and/or the location information of the transmitted light fixture, the mobile is able to estimate its own location, or the location of the light fixture that transmitted a received beacon.

For at least some embodiments, the light fixtures 110, 111, 112, 113 manage the transmission of the beacons. For an embodiment, the light fixtures 110, 111, 112, 113 manage transmission of the beacons by only transmitting beacons upon the light fixtures 110, 111, 112, 113 sensing motion. That is, for example, each of the light fixtures 110, 111, 112, 113 only transmits beacons when sensing motion of, for example, the user and the mobile device 130. This advantageously saves power consumed by the light fixtures 110, 111, 112, 113 because the light fixtures 110, 111, 112, 113 only transmit beacons which consumes power when a user is detected through motion detection.

For another embodiment, the light fixtures 110, 111, 112, 113 only transmit beacons when a location request is received by one or more of the light fixtures 110, 111, 112, 113 from the mobile device. That is, for example, the mobile device transmits a "where am I" request. Upon receiving the request, the light fixture(s) that receives the request begin(s) transmitting beacons. Again, this embodiment saves power because beacons are only transmitted when requested, and only transmitted from light fixtures that receive the request.

Figure 2:
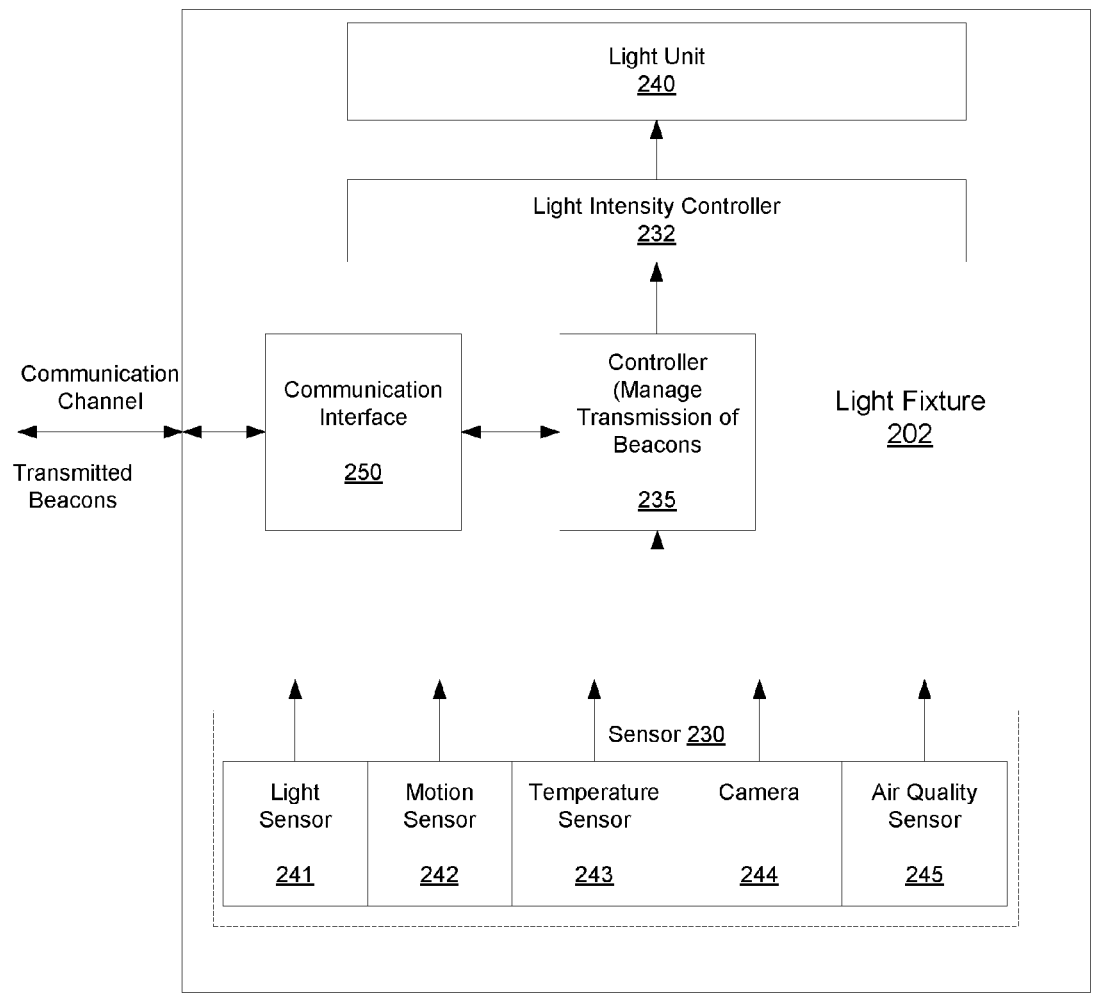
FIG. 2 shows a light fixture, according to an embodiment.

FIG. 2 shows a light fixture 202, according to an embodiment. The light fixture 202 includes a sensor unit 230 and a light intensity controller 232. The sensor unit 230 includes at least one sensor (such as, a light sensor 241, a motion sensor 242, a temperature sensor 243, a camera 244 and/or an air quality sensor 245), wherein the sensor operative to generate a sense signal base on at least one of sensed motion or light. The light fixture 202 further includes communication circuitry 250. The communication circuitry 250 is operative to maintain a link (the link can be wired or wireless) with a network. The light fixture 202 further includes a controller 235. For at least some embodiments, the controller 235 is operative to manage communication with the network, manage transmission of beacons through the communication circuitry, and generate dimming control base on at least one of the sensed signal and communication from the network. As described, for at least some embodiments, the beacons include information associated with the fixture. The light intensity controller 232 is configured to receive the dimming control and operative to adjust an emitted light intensity of a luminaire 240 of the light fixture 202.

As previously described, for at least some embodiments, the information within the transmitted beacons that is associated with the fixture includes location information of the fixture. For at least some embodiments, the information associated with the fixture includes an identifier of the fixture.

As previously described, for at least some embodiments, the sensor includes a motion sensor, and wherein managing transmission of the beacons includes triggering transmission of a beacon upon sensing motion by the motion sensor. For an embodiment, the transmission of the beacon is triggered by sensing motion of greater than a predetermined threshold. For at least some embodiments, the light fixture includes a battery, wherein the battery provides electrical power to the light fixture. The triggering of beacons under certain conditions (such as sensing motion) provides power savings over implementations that continuously transmit beacons. This is desirable for battery powered light fixtures.

For at least some embodiments, managing transmission of the beacons includes transmitting beacon continuously over time.

As previously described, for at least some embodiments, managing transmission of the beacons comprises transmitting the beacons with at a transmission signal power level of less than a threshold level, wherein the transmitted beacon cover less than predetermined area. By limiting the power level of the transmitted beacons, the range or distance away from a light fixture in which the mobile device 130 can receive beacons is limited. Therefore, as a first approximation, the location of the mobile device can be assumed to be the location of the light fixture that transmitted the beacon. As the mobile device received beacons from multiple light fixtures, the estimated location of the mobile device can be improved. For an embodiment, the beacons are transmitted using a low-power Blue Tooth transceiver.

As previously described, for at least some embodiments, a plurality of other light fixtures transmit beacons at a transmission signal power level of less than the threshold, enabling a mobile device to receive beacons from the light fixture and the other light fixtures and estimate a location of the mobile device, wherein estimating the location of the mobile device includes measuring a receive signal strength of the received beacons, estimating a distance between the mobile device and the light fixture and between the mobile device and each of the other light fixtures, and estimating the location by triangulating the estimated distances. For at least some embodiments, each of the light fixture and the other light fixtures transmit the beacons after sensing motion, thereby limiting how many light fixtures transmit beacons.

As previously described, for at least some embodiments, managing the transmission of beacons includes receiving a location request from a mobile device, and responding with transmission of one or more beacons. For at least some embodiments, the transmitted beacons include a location of the light fixture, and wherein the mobile device determines its location based on the location information of the light fixture. For at least some embodiments, the transmitted beacons include an identifier of the light fixture, and wherein the mobile device determines its location by determining a location of the light fixture based on the identifier. For example, for an embodiment, the mobile device accesses the location based on the identified and known location(s) of the light fixture(s). At least some embodiments further include supplementing the location determination with RSSI (receive signal strength indicator) measurements between the mobile device and the light fixture.

For at least some embodiments, the light fixture is further operative to receive a broadcast message from a central controller, wherein reception of the broadcast message puts the light fixture into a known condition, wherein putting the light fixture in the known condition communicates to a user that the light fixture is prepared for commissioning, establishing, through the managed transmission of the beacons, communication between the light fixture and a mobile device of the user, and communicating, by either the light fixture or the mobile device, a location of the user at a time of the established communication, to the central controller, thereby allowing the central controller to record a location of the light fixture.

While shown as the light fixture 202 that controls the intensity of light of the light unit (luminaire) 240, it is to be understood that for at least some embodiments the light fixture is a fixed building fixture includes an environment controller that is configured to sense at least one of sensed motion or light and generate an environment adjustment control to adjust an environmental parameter of a structure of one or more of building control fixtures based on the environment adjustment control.

Figure 3:
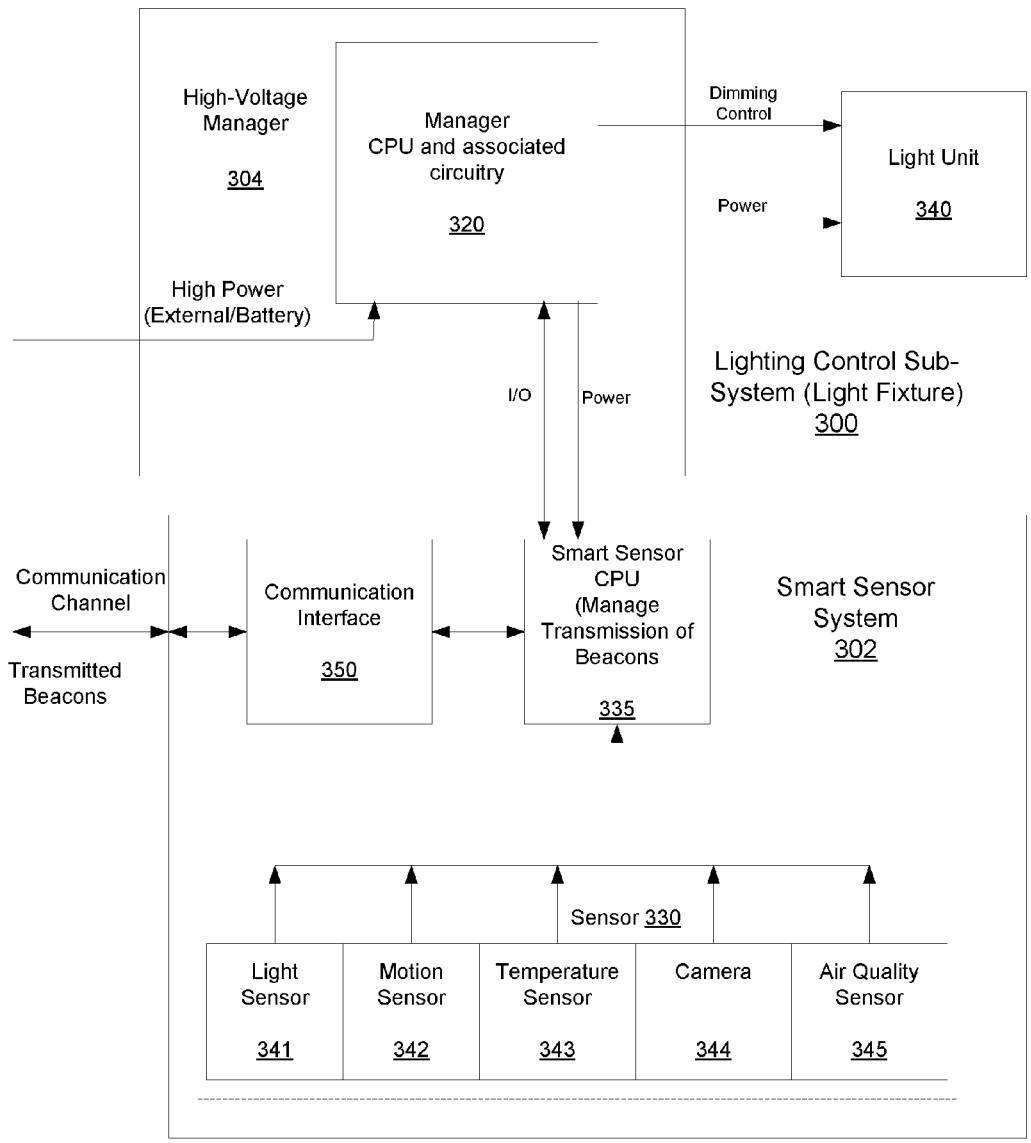
FIG. 3 shows a light fixture, according to another embodiment.

FIG. 3 shows a light fixture, according to another embodiment. The exemplary light fixture 300 (which could alternatively by referred to as lighting control subsystem because of the multiple controls) includes a smart sensor system 302 that is interfaced with a high-voltage manager 304, which is interfaced with a luminaire 340. The high-voltage manager 304 includes a controller (manager CPU) 320 that is coupled to the luminaire 340, and to a smart sensor CPU 335 of the smart sensor system 302. As shown, the smart sensor CPU 335 is coupled to a communication interface 350, wherein the communication interface 350 couples the controller to an external device. The smart sensor system 302 additionally includes a sensor 330. As indicated, the sensor 330 can include one or more of a light sensor 341, a motion sensor 342, and temperature sensor 343, a camera 344 and/or an air quality sensor 345. It is to be understood that this is not an exhaustive list of sensors. That is additional or alternate sensors can be utilized for lighting and/or environmental control of a structure that utilizes the lighting control sub-system 300. The sensor 330 is coupled to the smart sensor CPU 335, and the sensor 330 generates a sensed input. For at least one embodiment, at least one of the sensors is utilized for communication with the mobile device.

According to at least some embodiments, the controllers (manager CPU 320 and the smart sensor CPU 335) are operative to control a light output of the luminaire 340 based at least in part on the sensed input, and communicate at least one of state or sensed information to the external device.

For at least some embodiments, the high-voltage manager 304 receives the high-power voltage and generates power control for the luminaire 340, and generates a low-voltage supply for the smart sensor system 302. As suggested, the high-voltage manager 304 and the smart sensor system 302 interact to control a light output of the luminaire 340 based at least in part on the sensed input, and communicate at least one of state or sensed information to the external device. The high-voltage manager 304 and the smart sensor system 302 can also receive state or control information from the external device, which can influence the control of the light output of the luminaire 340. While the manager CPU 320 of the high-voltage manager 304 and the smart sensor CPU 335 of the smart sensor system 302 are shown as separate controllers, it is to be understood that for at least some embodiments the two separate controllers (CPUs) 320, 335 can be implemented as single controller or CPU.

For at least some embodiments, at least one of the (CPUs) 320, 335 manage the transmission of the beacons.

For at least some embodiments, the communication interface 350 provides a wireless link to external devices (for example, the central controller, the mobile device and/or other lighting sub-systems or devices). Further, for an embodiment, the communication interface 350 provides a means for the (CPUs) 320, 335 to control the transmission of the beacons.

An embodiment of the high-voltage manager 304 of the lighting control sub-system 300 further includes an energy meter (also referred to as a power monitoring unit), which receives the electrical power of the lighting control sub-system 300. The energy meter measures and monitors the power being dissipated by the lighting control sub-system 300. For at least some embodiments, the monitoring of the dissipated power provides for precise monitoring of the dissipated power. Therefore, if the manager CPU 320 receives a demand response (typically, a request from a power company that is received during periods of high power demands) from, for example, a power company, the manager CPU 320 can determine how well the lighting control sub-system 300 is responding to the received demand response. Additionally, or alternatively, the manager CPU 320 can provide indications of how much energy (power) is being used, or saved.

As previously mentioned, while shown as controlling the intensity of light of a light unit 340, at least some embodiments include any other type of environmental control, such as, temperature, noise, humidity, etc.

Figure 4:
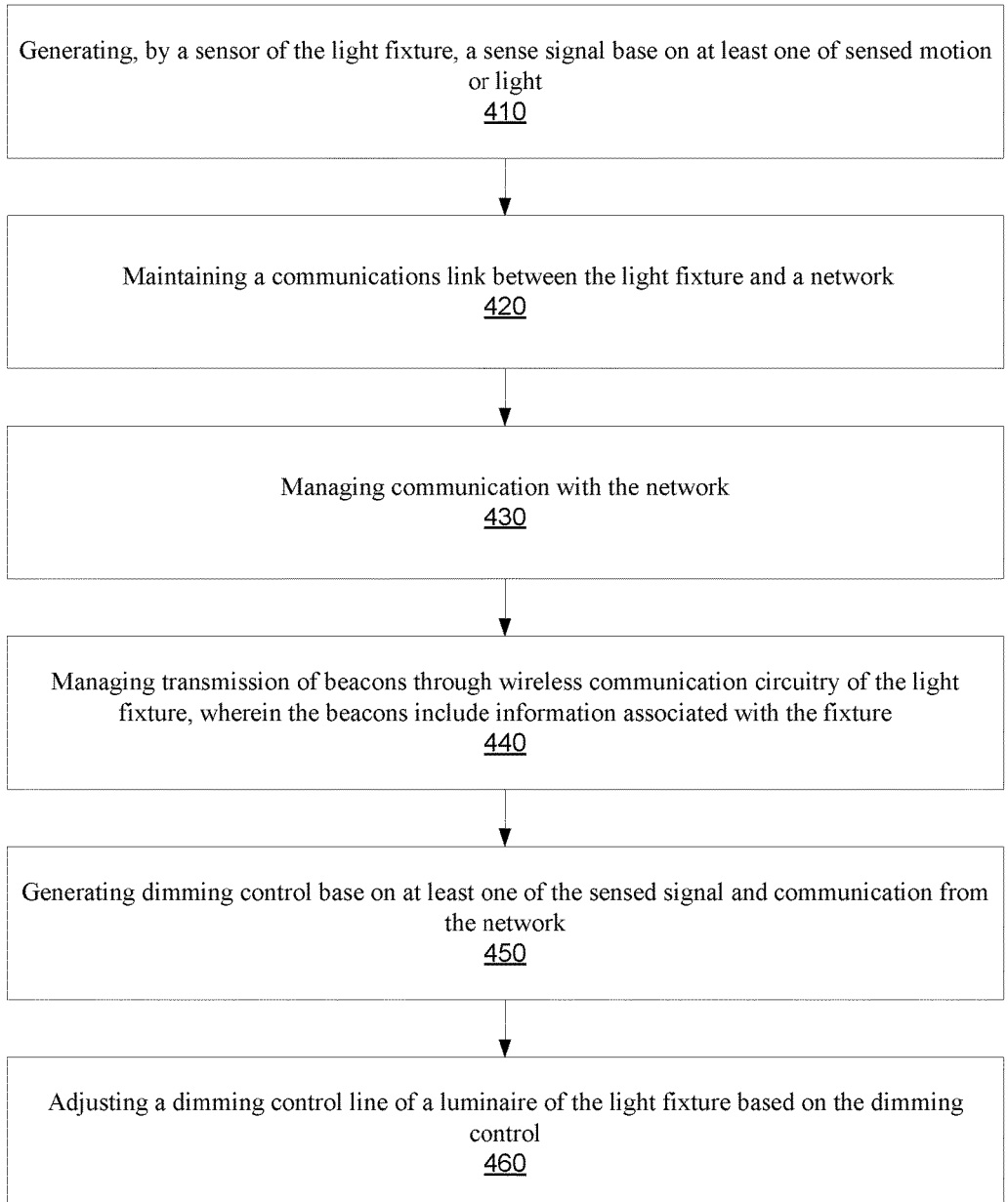
FIG. 4 is a flow chart that includes steps of a method of controlling a light fixture, according to an embodiment.

FIG. 4 is a flow chart that includes steps of a method of controlling a light fixture, according to an embodiment. A first step 410 includes generating, by a sensor of the light fixture, a sense signal base on at least one of sensed motion or light. A second step 420 includes maintaining a communications link between the light fixture and a network. A third step 430 includes managing communication with the network. A fourth step 440 includes managing transmission of beacons through wireless communication circuitry of the light fixture, wherein the beacons include information associated with the fixture. A fifth step 450 includes generating dimming control base on at least one of the sensed signal and communication from the network. A sixth step 460 includes adjusting a dimming control line of a luminaire of the light fixture based on the dimming control.

For at least some embodiments, the sensor includes a motion sensor, and wherein managing transmission of the beacons comprises triggering transmission of a beacon upon sensing motion by the motion sensor.

For at least some embodiments, managing transmission of the beacons comprises transmitting the beacons with at a transmission signal power level of less than a threshold level, wherein the transmitted beacon cover less than predetermined area.

For at least some embodiments, a plurality of other light fixtures transmit beacons at a transmission signal power level of less than the threshold, enabling a mobile device to receive beacons from the light fixture and the other light fixtures and estimate a location of the mobile device, wherein estimating the location of the mobile device comprises measuring a receive signal strength of the received beacons, estimating a distance between the mobile device and the light fixture and between the mobile device and each of the other light fixtures, and estimating the location by triangulating the estimated distances.

For at least some embodiments, each of the light fixture and the other light fixtures transmit the beacons after sensing motion, thereby limiting how many light fixtures transmit beacons.

For at least some embodiments, managing the transmission of beacons includes receiving a location request from a mobile device, and responding with transmission of one or more beacons, wherein the transmitted beacons include a location of the light fixture, and wherein the mobile device determines its location based on the location information of the light fixture.

Figure 5:
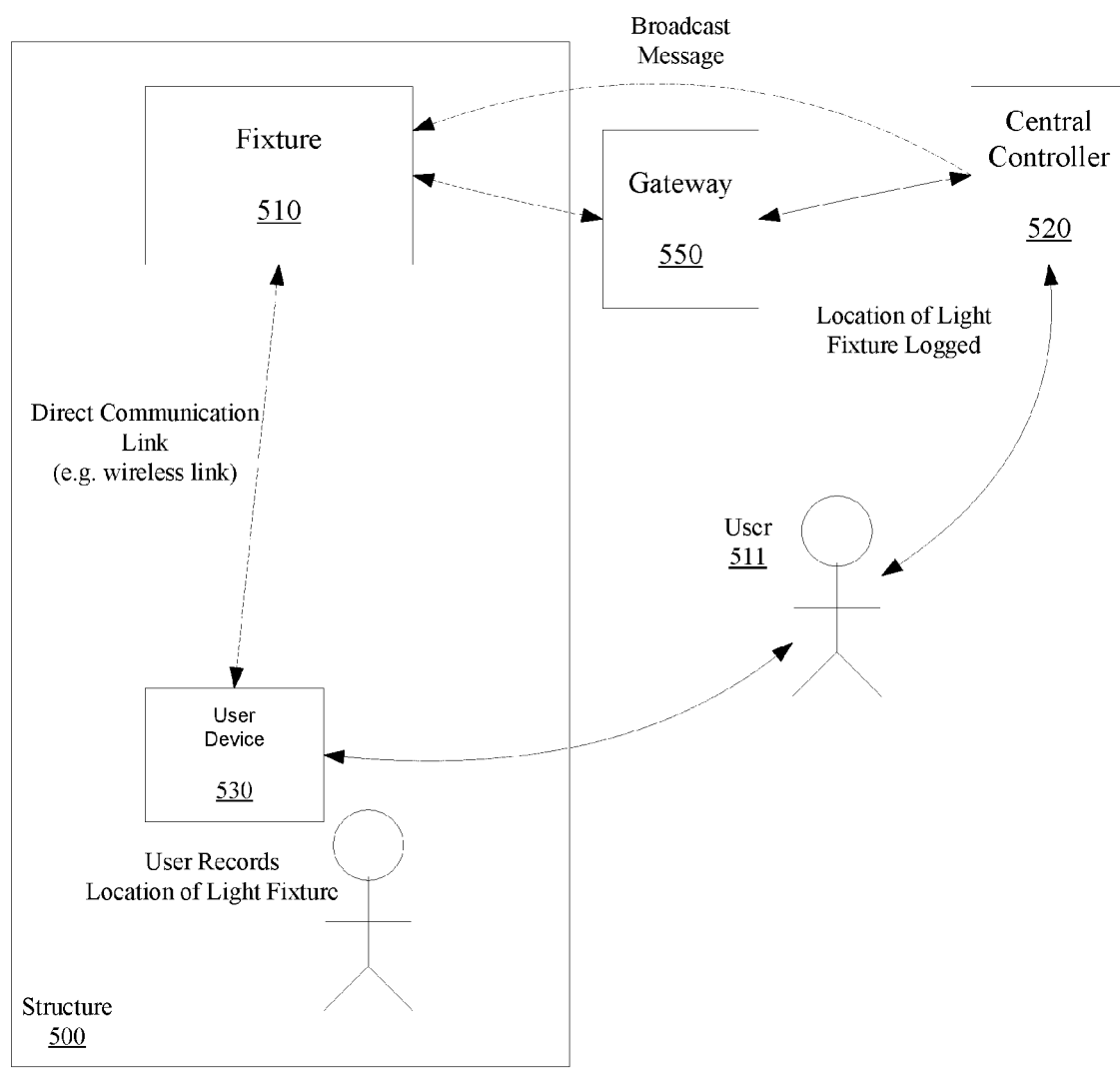
FIG. 5 shows a user commissioning a light fixture of a lighting control system, according to an embodiment.

FIG. 5 shows a user commissioning a light fixture 510 (or any other type of building control fixture) of a lighting control system, according to an embodiment. For at least some embodiments, a user travels about a structure 500 and communicates (through a mobile device 530) with light fixtures (such as, light fixture 510) within the structure. The user or the mobile device 530 identifies a location of the mobile device 530 at the time the mobile device 530 or the user is communicating with the light fixtures. For at least some embodiments, during communication with the light fixture 510, the user and the mobile device 530 are located physically proximate to the light fixture 510. Therefore, a location of the light fixture 510 can be approximated by the location of the user and/or the mobile device 530. Once determined or approximated, the location of the light fixture 510 can be communicated to a central controller 520, wherein the central controller 520 logs the location of the light fixture 510 for future reference.

The described embodiments include various different embodiments of the central controller. For an embodiment, the central controller is a standalone server. For another embodiment, the central controller is a mobile device that can be carried and transported by the user. For yet another embodiment, the central controller is a mobile device that can be carried by the user, and additionally synchronized to another central controlling device. For another embodiment, the gateway 550 and central controller 520 are combined in a single device that includes the functionality of both. For another embodiment, the central controller is included within one or more of the fixtures. That is, the controller can be included within a single fixture, or the functionality of the controller can be distributed among controllers within multiple of the fixtures.

For at least some embodiments, the commissioning process begins with the central controller 520 broadcasting a message that is received by one or more light fixtures, such as, light fixture 510. As shown, for an embodiment, the central controller 520 communicates with the light fixture 510 through a gateway 550. The communication channel between the central controller 520 and the gateway 550 can be wired or wireless. For an embodiment, the communication channel is an Ethernet connection. Further, the communication channel between the gateway 550 and the light fixture can be wired or wireless. Note for other embodiments, the commissioning process can be initiated by the fixture themselves.

For an embodiment, reception of the broadcast puts the light fixture 510 into a predetermined or known mode of operation. For an embodiment, reception of the broadcast message puts the light fixture 510 in the known condition, thereby communicating to the user that the light fixture 510 is prepared for commissioning. Once ready for commissioning, communication between the user or the mobile device 530 and the light fixture 510, can be completed. For an embodiment, reception of the broadcast message causes the light fixture 510 to power cycle and dim, and further, to report a sensed light levels corresponding with the power cycling.

When the light fixture 510 is prepared for communication, the mobile device 530 establishes communication with the light fixture. For an embodiment, the communication is initiated by a light emitting device of the user that generates pulses (strobes) of light. A light sensor of the light fixture 510 sensing the pulsing light, and then communicates back to the user 511 that communication from the user 511 has been received. For an embodiment, the light fixture 510 communicates to the user with a visible (such as a light) indicator. While this embodiment include communicating between the mobile device 530 (or user) being accomplished through light, it is to be understood that any method of communication can be used, including, but not limited to audio, motion and/or electromagnetic communication. The communication provides a means for establishing the location of the light fixture based on a location of the user/mobile device.

Once the location of the light fixture 510 has been determined or estimated, the location of the light fixture 510 is communicated to the central controller 520. For an embodiment, the user physically enters the location into the central controller 520. For another embodiment, the mobile device 530 automatically updates the central controller 520. For another embodiment, the light fixture 510 obtains its location information, and updates the central controller. For another embodiment, the central controller 520 and the mobile device 530 are the same device which automatically updates its own light fixture data base.

The location information can be determined in a number of ways. The user may know where he/she is located within the structure. For an embodiment, the mobile device 530 includes a global positioning system (GPS) receiver and automatically determines its location. For at least some embodiments, the mobile device 530 determines its location by triangulating received radio frequency (RF) signal from, for example, WiFi routers located proximate to the mobile device 530. By knowing the locations of the WiFi routers, the mobile device can approximate its location based on the know locations and a received signal strength of the RF signals of the WiFi routers.

Figure 6:
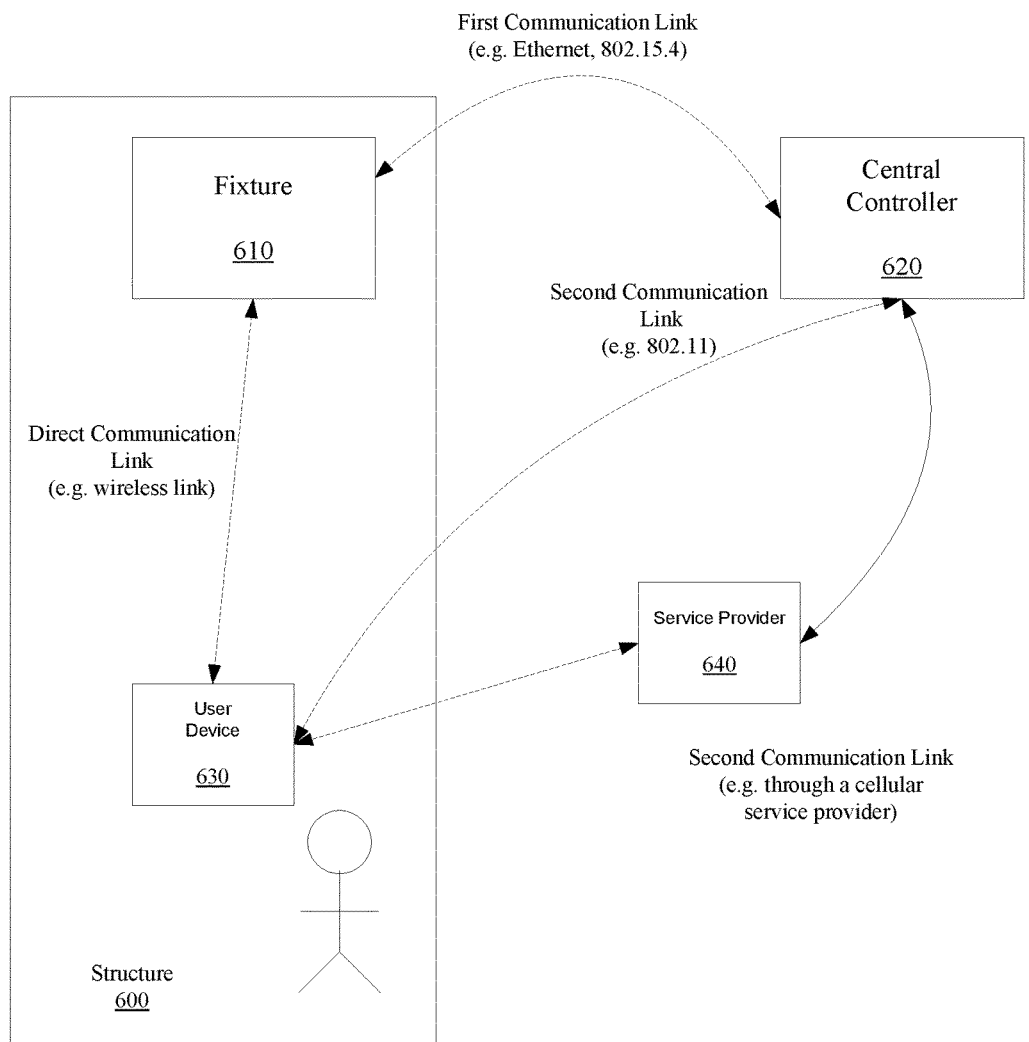
FIG. 6 shows a user commissioning a light fixture of a lighting control system, according to another embodiment.

FIG. 6 shows a user commissioning the light fixture 610 (or any other type of building control fixture) of a lighting control system of a structure 600, according to another embodiment. For this embodiment, a first communication link is established between the central controller 620 and the light fixture 610, and a second communication link is established between the mobile device 630 and the central controller 620. For an embodiment, the second communication link includes a direct WiFi (802.11) wireless link. For another embodiment, the second communication link includes an indirect link through a service provider 640. That is, for example, the mobile device 630 can establish a wireless (such as, cellular) link to the service provider 640. The service provider 640 is then network connected to the central controller 620.

Figure 7:
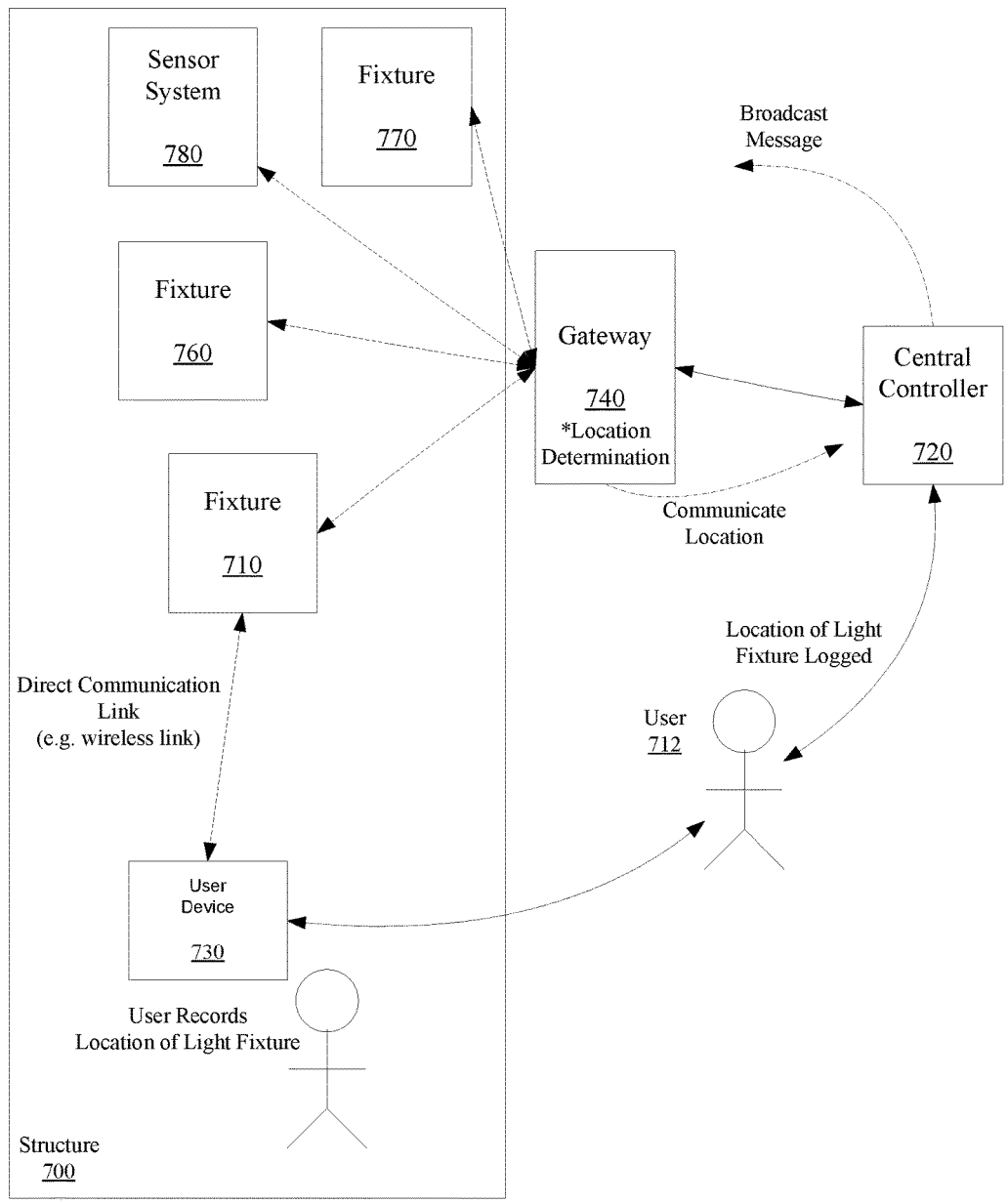
FIG. 7 shows a commissioning a gateway of a lighting control system, according to an embodiment.

FIG. 7 shows a commissioning a gateway of a lighting control system, according to an embodiment. The embodiments for commissioning a light fixture can be extended to further include commissioning of other devices of the lighting system, such as, gateways (such as, gateway 740), sensors (such as, sensor system 780), which can themselves by standalone devices, and switches.

For an embodiment, the gateway includes a simple pass through device that just converts from one communication medium to the other. For a specific embodiment, the gateway converts messages from the IEEE 802.15.4 standard to the IEEE 802.11 standard.

For various embodiments, the switches include any of one or more control devices, such as, a wall switch, a desktop remote, a cell phone or tablet.

As shown in FIG. 7, several light fixtures 710, 760, 770 (or any other type of building control fixtures) can determine their location utilizing the described embodiments. Further, the light fixtures 710, 760, 770 are in communication with, for example, a gateway 740. For at least some embodiments, after the light fixtures 710, 760, 770 and/or sensor system 780, have determined their location, the light fixtures 710, 760, 770 and/or sensor system 780, transmit wireless messages that include their determined location. The gateway 740 receives the wireless messages, and is able to approximate its location by triangulating based on the locations of the light fixtures 710, 760, 770. That is, based on a received signal strength (RSSI) of the received wireless signals, the gateway 740 can approximate its distance from each of the light fixtures 710, 760, 770. Further, based on the location of each light fixture 710, 760, 770 and/or sensor system 780, included within the received wireless messages, the gateway 740 can approximate its own location.

While FIG. 7 only shows a single gateway 740, other embodiments include any number of gateways. The embodiments for location determination can be used for commissioning the gateways. Further, embodiments include gateway discovery, wherein the central controller provides one or more gateways with IP addresses. Further, for at least some embodiments, the location determination of each of the gateways includes each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture.

Alternatively, or additionally, other lighting system devices can be commissioned, and determine their location as well.

As shown, for an embodiment, the gateway 740 is network connected to a central controller 720. Further, as previously described, for at least some embodiments, a mobile (user) device 730 establishes a link to the light fixture 710. Further, for at least some embodiments, the user 712 logs locations of light fixtures of a structure 700 with the central controller 720.

The sensor system 780 (which can be an embodiment of the smart sensor system 202 of FIG. 2) can be utilized to provide additional information. For example, unlike the light fixtures 710, 760, 770, the sensor system can be strategically located within a structure. For example, the sensor system 780 may include a temperature sensor. By locating the sensor system 780 at a location within the structure that more closely approximates the temperature within the structure where occupants are located, the temperature sensed by the sensor system 780 more accurately represents the temperature that the occupants are subject to. That is, the light fixtures 710, 760, 770 are typically located on a ceiling of the structure which does not allow for an accurate representation of the temperature within the structure that occupants are experiencing.

Figure 8:
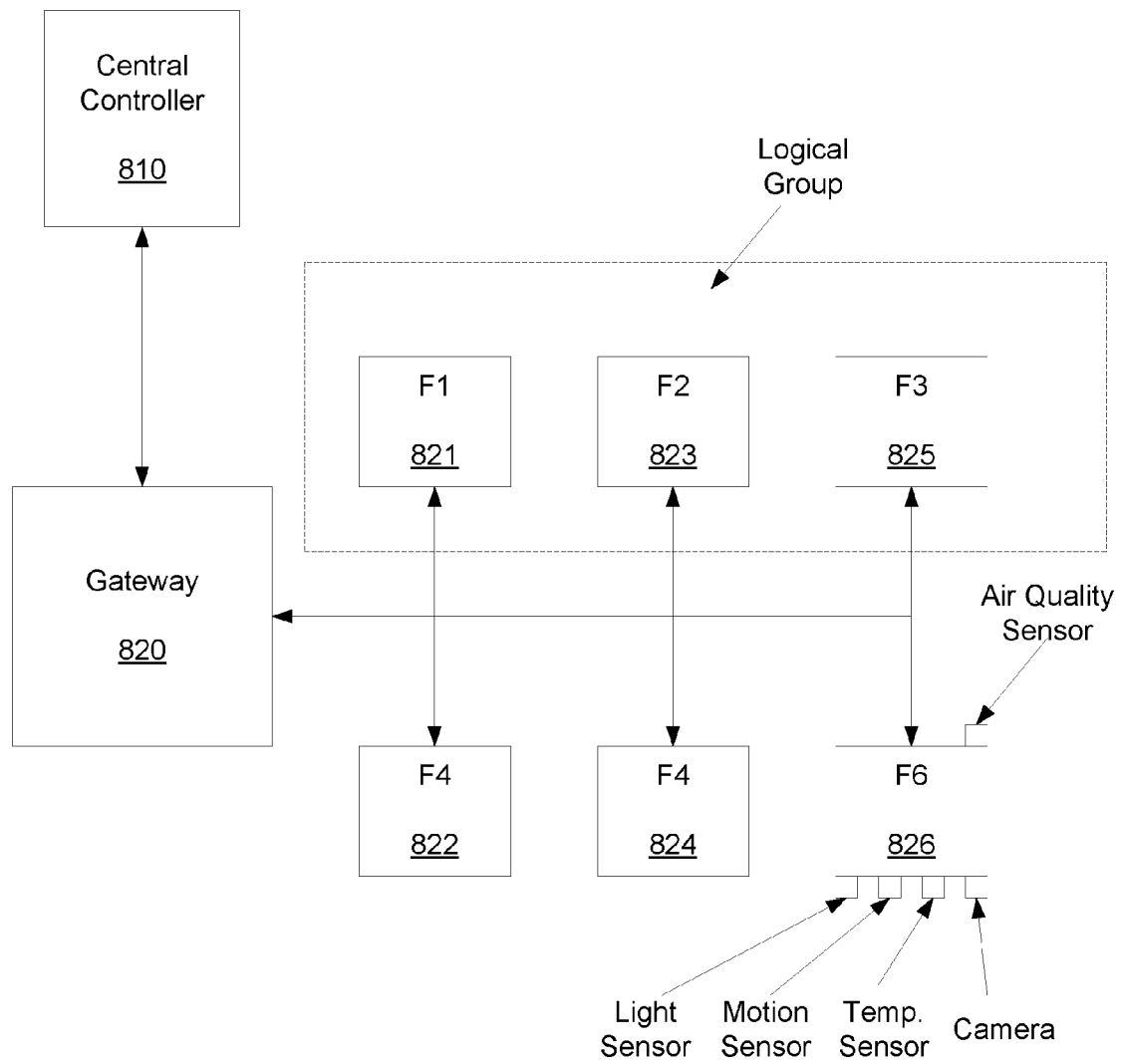
FIG. 8 shows a distributed lighting control system that includes that includes a logical group of light fixtures and a central controller, according to an embodiment.

FIG. 8 shows a distributed lighting control system that includes that includes a logical group of light fixtures 821, 822, 823, 824, 825, 826 and a central controller 810, according to an embodiment. As described, for an embodiment, the central controller 810 can communicate with the light fixtures 821, 822, 823, 824, 825, 826 through a gateway 820. At least some embodiments of the lighting control system include a plurality of the lighting control sub-system (each lighting control sub-system can include a light fixture). Each of the lighting control sub-systems can operate independently, in coordination with other lighting control sub-systems (for example, existing hard-wired systems), and/or in coordination with a central controller. As such, each of the lighting control sub-systems can be independently installed, and adapt their operation accordingly.

As shown, the light fixtures 821, 822, 823, 824, 825, 826 can be organized, or they can organize themselves into logical groups. Once included as a part of a logical group, a light fixture can be controlled based on state or sense information of other light fixtures within the logical group. Additionally, the logical group can be commonly controlled. For an embodiment, at least one of the logical groups includes a motion sensing group. For an embodiment, at least one of the logical groups includes an ambient light group. For an embodiment, at least one of the logical groups includes a logical switch group. For an embodiment, at least one of the logical groups includes a logical temperature group. Further, logical groups can be defined by attributes of a structure in which the light fixtures are located. For example, light fixture located within a hallway of a structure may be grouped, light fixtures within a conference room, a bath room or a storage room may be grouped into logical groups.

During commissioning, the logical groups can be auto-assigned based on information, like location, that is determined during commissioning. Group attributes can be selected based on location and type (like corridor, office).

Based on the maps and known locations, logical groups can be intelligently and automatically allocated. Further, logical group formations can be influenced by the locations of the light fixtures determined during commissioning.

As previously stated, an embodiment of the lighting control sub-system includes a communication interface, a controller (listed in discussion as a single controller, but as previously described, at least some embodiment include multiple controllers, such as, the high-voltage manager 204 and the smart sensor CPU 235), a luminaire, a light sensor, and a motion sensor. For an embodiment, the luminaire is a lighting unit consisting of one or more lamps, socket(s) and parts that hold the lamp(s) in place and protect them, wiring that connects the lamp(s) to a power source, and reflector(s) to help direct and distribute the light. Various embodiments of luminaires include bulb technologies, such as incandescent, florescent, and LED (light emitting diode). Further, various embodiments of the luminaires are controllably turned on and off, and further, are controllably dimmable.

For at least some embodiments, the controller makes decisions as to turning on, turning off, and dimming the luminaires. The controller does this, for example, either due to command from an external device (such as, the central controller), or by processing decision rules using inputs from the sensors, a saved configuration, time of day, passage of time from past sensor inputs, and/or from state or sensor values from other sub-systems. Additionally or alternatively, learned behavior can influence the decisions.

For at least some embodiments, the sensors sense (or measures) some physical quantity and converts it into a digital value. For an embodiment, the sensors are packaged together with the controller. More specifically, for various embodiments of the lighting control sub-system, multiple sensors of the lighting control sub-system include a motion sensor, a light sensor, and temperature sensors located in the same physical module, which is connected to the other physical modules with a cable. For an embodiment, the sensor(s) are physically located beside the luminaire, and the motion and light sensors are directed towards the floor of a structure in which the lighting control sub-system is located. For an embodiment, the sensor(s) are directly connected to the controller.

For an embodiment, the controller is further operative to receive information from an external device, wherein the received information influences a current state of the lighting control sub-system, or the received information includes parameters that influence a future state of the lighting control sub-system. For an embodiment, the received information influences a lighting control sub-system profile. For an embodiment, the lighting sub-system profile includes a set of values (parameters) that affect the operation of the controller in determining how it controls the light output of the luminaire based on current and past sensor inputs, time of day or passage of time. For at least some embodiments, the parameters are adaptively updated.

For at least some embodiments, the controller is operative to receive a plurality of lighting control sub-system profiles. That is, there can be more than one lighting control sub-system profile, and the lighting control sub-system profiles can be adaptively updated. More specifically, an active profile or present profile of the plurality of lighting control sub-system profiles can be adaptively updated. Further, for at least some embodiments, the external device can add, replace or delete one or more profiles of the plurality of lighting control sub-system profiles.

FIG. 9 is a flow chart that includes steps of a method of commissioning a light fixture, according to an embodiment. A first step 910 includes receiving, by the light fixture, a broadcast message from a central controller, wherein reception of the broadcast message puts the light fixture into a known condition. A second step 920 includes establishing communication between the light fixture and a user. A third step 930 includes communicating, by either the light fixture or the user, a location of the user at a time of the established communication, to the central controller, thereby allowing the central controller to record a location of the light fixture.

As described, for an embodiment, putting the light fixture in the known condition communicates to the user that the light fixture is prepared for commissioning. The communication to the user can be visual, audible, or communicated to the user by any means available.

An embodiment further includes initiating diagnostics of the lighting system of the light fixture. That is, different lighting system devices can communicate with each other over different communication channels. Through this communication, the lighting system devices can run diagnostics to test, for example, that all the electrical wiring has been done correctly, the sensors are working correctly and the controllable systems (lights, etc.) are responding correctly.

For an embodiment, the light fixture is a part of a lighting system that includes other lighting system devices, such as, gateways and switches. An embodiment further includes determining a communication link quality between the light fixture and one or more lighting system devices. An embodiment further includes estimating a location of at least one of the lighting system devices based on the location of the light fixture and the communication link quality between the light fixture and the at least one lighting system device. An embodiment further includes estimating the location of the at least one lighting system device based on locations of a plurality of lighting fixtures, and link qualities between the at least one lighting system device and each of the plurality of lighting fixtures. That is, for example, trilateration between the lighting system device and the plurality of lighting fixtures can be used to estimate the location of the lighting system device.

An embodiment further includes discovering the one or more gateways, wherein discovery includes providing, by the central controller, the one or more gateways with IP addresses, and determining a location of each of the gateways, including each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture. For an embodiment, if multiple gateways receive the message, a signal quality of the message is used to determine which of the gateways is closest to the at least one light fixture, and therefore determines the location of the gateway that is the closest.

An embodiment includes sensing, by the light fixture, a presence of a user. For an embodiment, the presence of the user is sensed through a motion sensor.

For an embodiment, establishing the communication link includes the light fixture providing the user with an indicator that the light fixture has received an initial communication from the user. For an embodiment, the communication is established between the light fixture and the user through a strobing light. For an embodiment, the communication is established between the light fixture and the user through an RF signal, such as, 802.15.4 or Zigbee.

For an embodiment, establishing the communication between the light fixture and the user includes the light fixture modulation light emitting from the fixture with information that provides identification of the light fixture. That is, for example, for an embodiment, the light fixture is operative to modulate light emitted from the light fixture with information that uniquely identifies the light fixture. For example, the information can include a MAC (media access control) address or an IP (internet protocol) address of the light fixture. The user can have a mobile device in the user's possession that demodulates the modulated light, thereby providing the mobile device with the identification information of the light fixture. This information along with the location information of the light fixture can be communicated to the central controller, thereby allowing the central controller to log the identification information of the light fixture along with the location information of the light fixture.

An embodiment further includes the user communicating the location of the light fixture directly to the central controller. This communication can be one or more of several different forms. For an embodiment, the user directly enters the location information to the central controller. For another embodiment, the user communicates (for example, via mobile device to mobile device through either a cellular or WiFi network) the location information to a second user who manually enters the location. For an embodiment, the user wirelessly communicates the location information through a network that is connected to the central controller. Again, the wireless communication can be cellular or WiFi. As previously described, for an embodiment, the mobile device and the central controller are the same device. For another embodiment, the light fixture communicates the location of the light fixture directly to the central controller.

As previously described, an embodiment includes a plurality of other light fixtures automatically determining their location based on the location of the light fixture. That is, once locations of several light fixtures have been determine, these light fixtures and their location can be used to allow other fixtures to automatically determined their own locations based off of the reception of messages from the known-location light fixtures. For example, the other light fixtures can triangulate based on estimated distances between the other light fixtures and the known-location fixtures. The messages include the location of the known-location fixture, and the distance can be estimated based on the received signal strength of the messages.

An embodiment further includes a plurality of light fixtures, wherein each light fixture automatically establishing communication between the light fixture and the user as the user travels in a structure that includes the plurality of light fixtures, wherein each light fixture automatically determines its location based on the established communication. That is, for example, a user can merely "walk around" a structure. The light fixtures automatically communicate with a mobile device. The location of the mobile device can be automatically communicated to the light fixtures, allowing each light fixture to estimate their location. GPS within the mobile device can be used to determine the location of the user. The communication links between the mobile device and each light fixture can be established when the mobile device is within a predetermined proximate distance of the light fixture.

Maps or floor plans of a structure in which the light fixtures are located can be utilized to aid the automatic location determination and grouping process. The maps can be photos or graphical illustrations of the floor plan which highlight relative locations of the light fixtures. The mapped locations can be used to make the trilateration process more accurate. Once the location is determined through trilateration, a "snap-to-grid" process can be utilized to align the estimated location to the known fixture locations. The maps and determined locations can also be used to provide more information about space within the structure, for example, whether a space is an office, hallway, open area, etc.

Lighting Fixture Reception of Beacons

Figure 10:
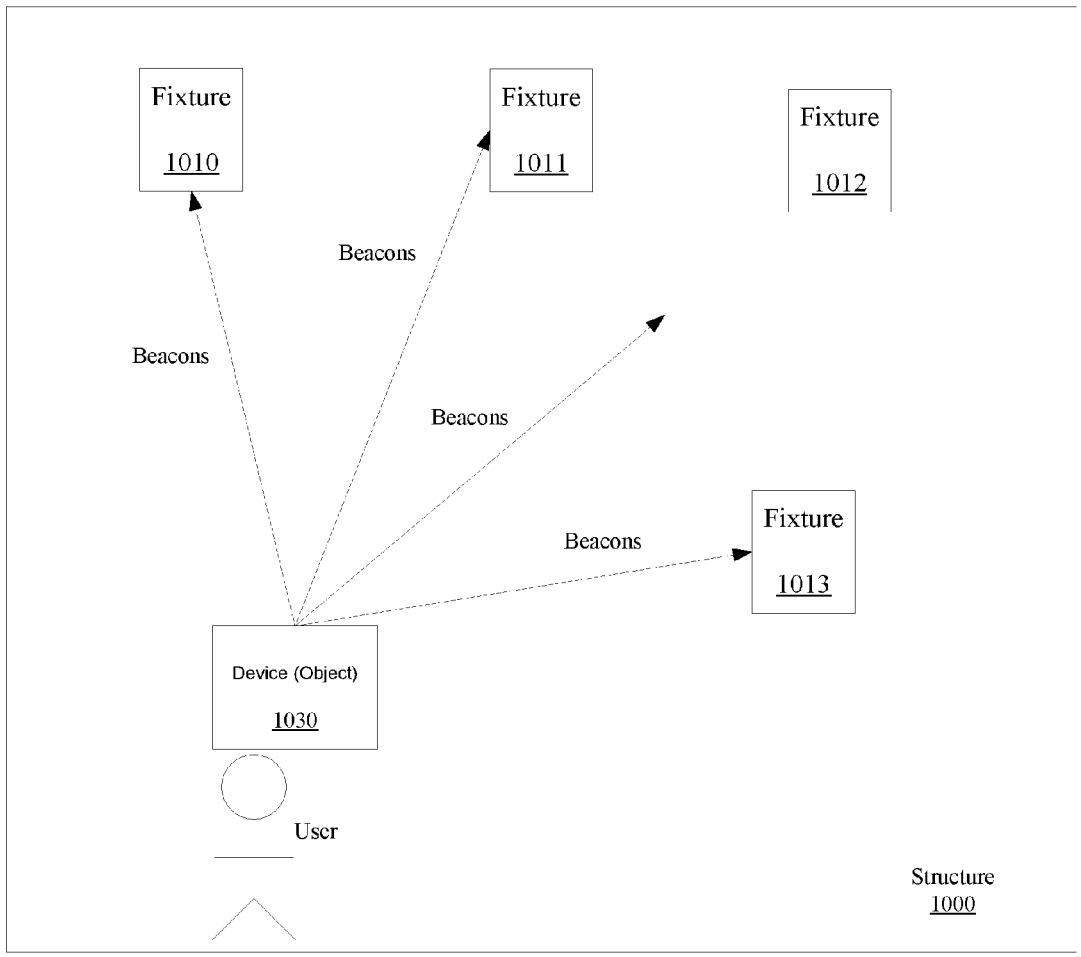
FIG. 10 shows a plurality of light fixtures that receive beacons that are transmitted by a mobile device, according to an embodiment.

FIG. 10 shows a plurality of light fixtures 1010, 1011, 1012, 1013 (or any other type of building control fixtures) within a structure 1000 that receive beacons that are transmitted by a device (also referred to as an object, or as a mobile device because for some embodiments the device is mobile) 1030, according to an embodiment. While at least some of the described embodiments include light fixtures transmitting beacons, at least some embodiments alternatively or additionally include one or more lighting fixtures receiving beacons from one or more devices.

As shown, a device (object) 1030 transmits beacons that are received by at least a subset of the light fixtures 1010, 1011, 1013. The light fixtures receive the beacons, and utilizing at least some information included within the beacons, one or more of the light fixtures manage the received beacons.

For an embodiment, a power level of signals transmitted from the device (object) 1030 is limited to be less than a threshold. By limiting the power level of the transmitted signals, the distance at which the transmitted signals can be received by the light fixtures is limited. For example, for an embodiment, the transmitted signal includes low-power Bluetooth® wireless signals. Due to the transmitted signal being low-power, one or more of the light fixtures only receive beacons from the device (object) 1030 if the device (object) 1030 is within a limited range (distance) from the one or more light fixtures. For an embodiment, the power level of the transmitted signals is set to be at or lower than a threshold amount to ensure that the device (object) 1030 is within a specified range (distance) of a light fixture in order for the light fixture to receive transmitted beacons. For example, the light fixtures 1010, 1011, 1013 may receive beacons transmitted from the device 1030, but the fixture 1012 may not receive a beacon because the device 1030 is out of range of the fixture 1012.

For at least some embodiments, one or more light fixture is operative to determine a received signal strength indicator (RSSI) of the received beacons, wherein the information associated with the object includes at least transmission power of the beacons, and wherein the one or more controllers associated with one or more light fixtures is operative (either locally and/or by a central or external controller) to estimate a distance between the light fixture and the object based on the RSSI of the received beacons and the transmission power of the beacons.

For at least some embodiment, the beacons include identification information that uniquely identifies the device (object) 1030 that transmitted the beacon. For at least some embodiments, the information associated with the object includes at least one of a transmission power of the beacons, a unique ID of the object, remaining battery power of the object, or manufacturer ID, device model, or communication protocol version.

In some environments there may be devices transmitting beacons which are not managed by the fixture. For at least some embodiments, the unique ID, a portion of the unique ID, or the manufacturer ID can be used to filter or ignore some received beacons. Filtering the received beacons based on manufacturer ID can have an advantage that filtering can be done without querying a database of unique ID data. Such a database would either require memory space on the controller, or take time to query if it were stored in a separate controller.

For at least some embodiments, the information associated with the object includes sensed motion of the object. That is, motion of the object is sensed, and information of this sensed motion is included within the beacons transmitted by the object or mobile device. For an embodiment, the sensed motion includes sensed acceleration of the object. For example, an accelerometer associated with the object senses motion or acceleration of the object. For an embodiment, a controller associated with the object includes the sensed acceleration in the beacons transmitted by the object.

For at least some embodiments, one or more controllers associated with the light fixtures are operative to detect or receive information about the orientation of the object at rest based on the magnitude and direction of acceleration in a three axis coordinate system. For at least some embodiments, the object includes a controller which processes the sensed acceleration information and generates the orientation information of the object, and transmits the orientation information to the sensor rather than the sensed acceleration information. If the device is stationary, the force of gravity acts on the accelerometer in a direction perpendicular to the ground, producing a measurement equivalent 1G, whereas the other two perpendicular directions will have acceleration close to zero. Device orientation can be valuable in interpreting RSSI in the context of an antenna that causes transmission strength to vary with orientation. If the device is rigidly attached to an object of interest which has a preferred orientation, device orientation information can be operative to indicate an alarm condition.

For at least some embodiments, the sensed acceleration of the object is used to detect if the object is moving, or stationary. Stationary objects will exhibit very little change in acceleration. The judgment of whether the object is moving can be used to influence a rate at which the device transmits the beacons. That is, for an embodiment, sensed accelerometer data is used locally at the object to control a frequency or timing of beacon message transmission. For an embodiment, the beacon transmission rate is lower or stopped if the object is determined to be stationary which reduces power requirements. For an embodiment, when the object is determined to be moving, the beacon transmission rate is started or increased. For an embodiment, the device 1030 only transmits beacons when a motion sensor of the device 1030 senses motion of the device 1030. This advantageously saves power consumed by the device 1030 and the light fixtures 1010, 1011, 1012, 1013 because the device only transmits beacons and the light fixtures 1010, 1011, 1012, 1013 only receive these beacons which consumes power when a motion of the device 1030 is detected through motion detection.

For at least some embodiments, the information associated with the object includes at least one of gyroscope data, magnetometer data, temperature data, air quality measurements.

For at least some embodiments, one or more controllers associated with one or more light fixtures is operative to estimate a distance between the light fixture and the object based in part by an RSSI of the received beacons and a transmission power of the beacons, and wherein at least one of the controller and another controller is operative to estimate a location of the object based on the estimated distance. That is, for example, each of a plurality of light fixtures receives beacons and each light fixture estimates a distance between the object and the receiving light fixture. The location of the object can be estimated based on known locations of each of the receiving light fixtures\ and trilateration of the estimated distances between each receiving light fixture and the object. Other methods can also be used to estimate object location including weighted average of receiving fixture locations, where weighting is based in part on RSSI at the receiver.

RSSI (Received Signal Strength Indicator) is known to fluctuate based on multipath effects and interference with objects or structures in the area. These effects can increase the location error. Another embodiment includes alternatively, or additionally (that is, supplementing other location methods) determining a location based on RSSI fingerprinting. In this approach the signal strength for a number of receivers is measured at a sampling of locations and stored. During localization (location determination), the stored values are compared to currently measured values to find the best matching location. The stored RSSI values at a given location can be to be updated as the environment changes, for instance, furniture is moved. This update process can be performed from data captured while tracking a mobile device. The tracked device will follow a connected smooth path in most cases. The most likely smooth path can provide location data and RSSI records at sample locations on that path. These can be compared to stored RSSI fingerprints and adapted when a consistent variation has been detected over time.

For at least some embodiments, location error is reduced by restricting objects from being located in areas where travel is not possible, that is, traveling through areas where there is a wall, or in general on paths that are not navigable. For at least some embodiments, typical travel paths are learned from occupancy data which is derived from independent sensors, and from floor plan data which must be known for fixture commissioning.

These object location methods apply in the described system configurations, that is, when beacons are transmitted from fixtures and received by a mobile device, or when beacons are transmitted by a device and received by the fixtures.

For at least some embodiments, the sensed acceleration includes a magnitude and direction of acceleration of the object along one or more directions. Integration of acceleration can be used to provide estimates of velocity, and integration of velocity can be used to provide estimates of position. The error accumulates quickly however, so these estimates are used over short movements. These estimates can also be used in combination with RSSI based position estimates to reduce overall estimation error for moving targets.

Gyroscope data, which measures device rotation, and magnetometer data, which acts as a compass to measure absolute orientation, can provide very useful data for location update estimation and are often used together with accelerometer data to reduce drift or improve accuracy in position update estimates. These methods are often referred to as dead reckoning methods.

For an embodiment, the light fixture is further operative to sense motion, and wherein location of the object is determined only after sensing the motion. That is, for example, a motion sensor of the fixture can sense motion, which provides sensing of occupancy of a room or structure in which the light fixture is located. The one or more controllers receive the occupancy data and the received beacon data and uses the data together to produce a location estimate for the beacon. In particular, if the beacon data (sensors at the beacon, RSSI data for all sensors receiving the beacon) produces a new position estimate that corresponds to a location in which a fixture has not sensed motion will be considered a lower probability estimate compared to a location where the fixture has sensed motion.

Figure 11:
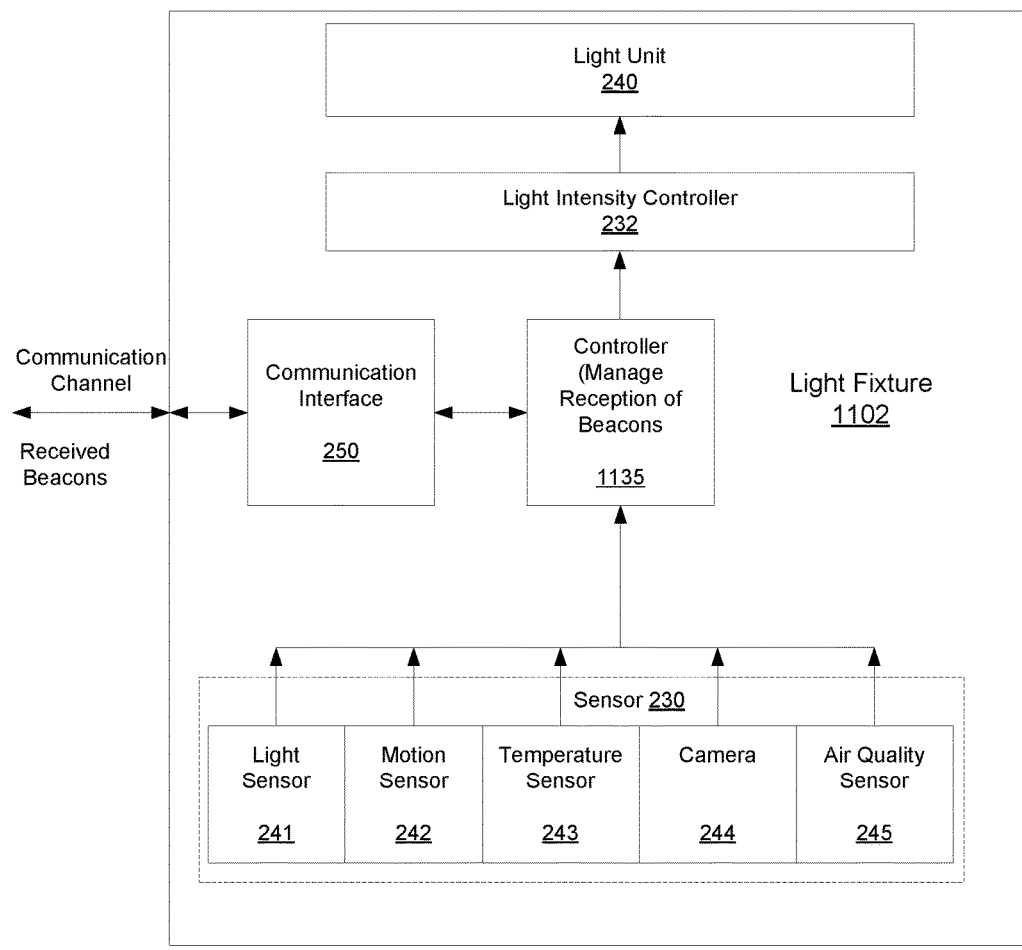
FIG. 11 shows a light fixture, according to another embodiment.

FIG. 11 shows a light fixture, according to another embodiment. This embodiment is similar to the embodiment of FIG. 2, but includes the controller 1135 of the light fixture 1102 managing the reception of beacons rather that transmission of beacons.

Figure 12:
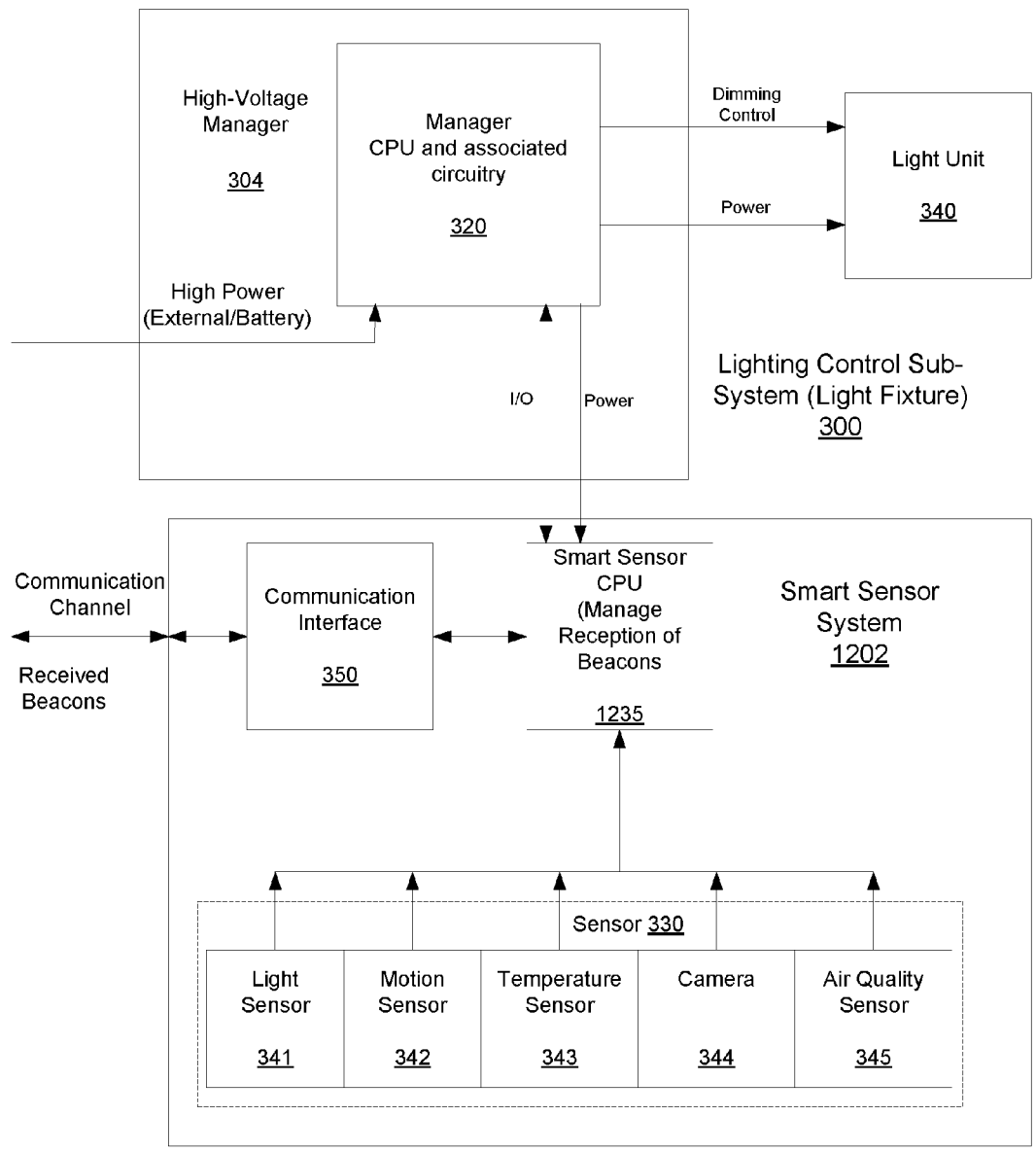
FIG. 12 shows a light fixture, according to another embodiment.

FIG. 12 shows a light fixture, according to another embodiment. This embodiment is similar to the embodiment of FIG. 3, but includes the smart sensor CPU 1235 of the smart sensor system 1202 managing the reception of beacons rather that transmission of beacons.

FIG. 13 is a flow chart that includes steps of a method of controlling a light fixture, according to another embodiment. A first step 1310 includes generating, by a sensor of the light fixture, a sense signal base on at least one of sensed motion or light. A second step 1320 includes maintaining a communications link between the light fixture and a network. A third step 1330 includes managing communication with the network. A fourth step 1340 includes managing manage reception of beacons through the wireless communication circuitry, wherein the beacons are received from an object, and the beacons include information associated with the object. A fifth step 1350 includes generating dimming control base on at least one of the sensed signal and communication from the network. A sixth step 1360 includes adjusting a dimming control line of a luminaire of the light fixture based on the dimming control.

As previously described, for at least some embodiments, the information associated with the object includes at least one of a transmission power of the beacons, a unique ID of the object, or remaining battery power of the object.

As previously described, for at least some embodiments, the light fixture is operative to determine a received signal strength indicator (RSSI) of the received beacons, wherein the information associated with the object includes at least transmission power of the beacons, and wherein the controller is operative to estimate a distance between the light fixture and the object based on the RSSI of the received beacons and the transmission power of the beacons.

As previously described, for at least some embodiments, the information associated with the object includes sensed motion of the object, wherein the sensed motion includes sensed acceleration of the object. For at least some embodiments, the sensed acceleration of the object influences a rate at which the object transmits the beacons.

As previously described, for at least some embodiments, estimating a distance between the light fixture and the object based on an RSSI of the received beacons and a transmission power of the beacons, and estimating a location of the object based on the estimated distance.

Figure 14:
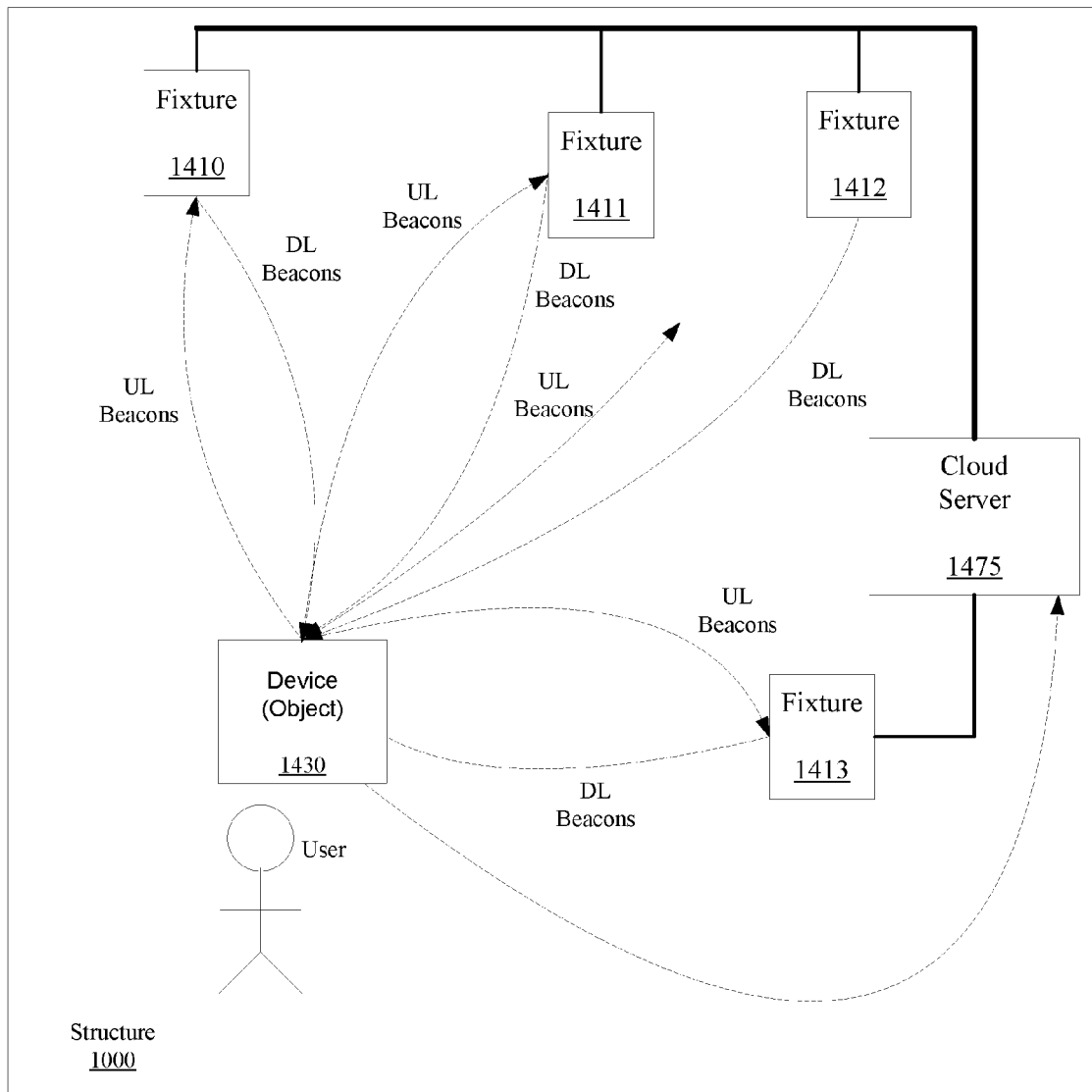
FIG. 14 shows a plurality of light fixtures that transmit beacons that are received by a device, and the plurality of fixtures receive beacons that are transmitted by the mobile device, according to an embodiment.

FIG. 14 shows a plurality of light fixtures 1410, 1411, 1412, 1413 (or any other type of building control fixtures) that transmit beacons that are received by a device 1430, and the plurality of fixtures 1410, 1411, 1412, 1413 receive beacons that are transmitted by the device 1430, according to an embodiment. For example, fixture 1410 transmits downlink (DL) beacons to the device 1430 and receives uplink (UL) beacons transmitted by the device 1430. Fixture 1411 transmits downlink (DL) beacons to the device 1430 and receives uplink (UL) beacons transmitted by the device 1430. Fixture 1413 transmits downlink (DL) beacons to the device 1430 and receives uplink (UL) beacons transmitted by the device 1430. However, Fixture 1412 transmits downlink (DL) beacons to the device 1430, but does not receive uplink (UL) beacons transmitted by the device 1430 because, for example, the device 1430 is too far away from the fixture 1412. The transmission power level of beacons transmitted in one direction may be more reliably received than beacons transmitted in the opposite direction. For example, the beacons transmitted in the downlink direction may be more reliable than beacons transmitted in the uplink direction.

The bidirectional transmission of the beacons between the device 1430 and the light fixtures 1410, 1411, 1412, 1413 provides for better accuracy in the determination of distances between the device 1430 and each of the light fixtures 1410, 1411, 1412, 1413. Further the bidirectional transmission of the beacons between the device 1430 and the light fixtures 1410, 1411, 1412, 1413 provides redundancy in information needed to determine distances between the device 1430 and the light fixtures 1410, 1411, 1412, 1413. For example, beacons may be transmitted from the light fixtures 1410, 1411, 1412, 1413 at a higher power level. Further, different wireless transmission protocols can be used in the uplink which is different from the transmission protocols used in the downlink.

At least some embodiments include adaptively determining which of the uplink and downlink beacons provide the better distance estimates, and adaptively calculating the distances accordingly. That is, one direction may be selected to be exclusively used for location determination, or the location determination may adaptively adjust how much of an influence either the uplink or downlink beacons have in the determination.

As shown, for an embodiment, the light fixtures 1410, 1411, 1412, 1413 are interfaced with a central of cloud controller or server 1475. For at least some embodiments, the distance calculations are at least partially performed by the cloud server 1475.

Figure 15:
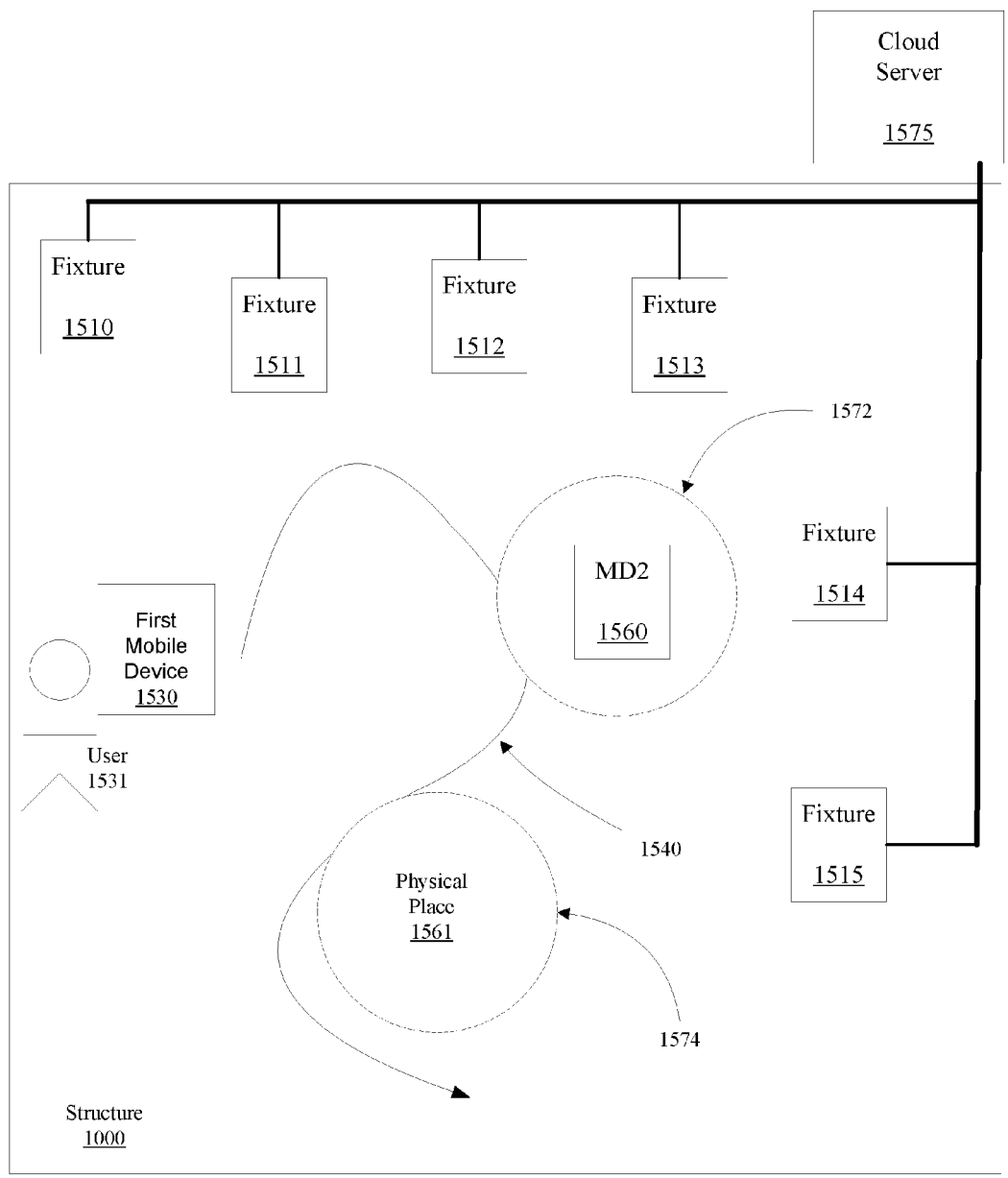
FIG. 15 shows a system that includes environment control building fixtures of a structure, that are operative to associate information with an asset (such as, a second mobile device) or a physical space.

FIG. 15 shows a system that includes environment control building fixtures 1510, 1511, 1412, 1513, 1514, 1515 of a structure 1000, that are operative to associate information with an asset (such as, a second mobile device 1560) or a physical space 1561. As previously described, and shown, for example, in FIG. 2 and FIG. 4, for an embodiment, one or more of the plurality of building fixtures 1510, 1511, 1412, 1513, 1514, 1515 includes a sensor unit (such as, smart sensor system 302) and an environment controller (such as, high-voltage manager 304).

As previously described, for at least some embodiment, the sensor unit includes a sensor, wherein the sensor operative to generate a sense signal based on at least one of sensed motion or light. Further, the sensor unit includes communication circuitry operative to maintain a link with a network, and a controller operative to manage communication with the network, and generate environment adjustment control based on at least one of the sensed signal and communication from the network.

As previously described, for at least some embodiments, the environment controller is configured to receive the environment adjustment control and operative to adjust an environmental parameter of a structure of the plurality of building control fixtures based on the environment adjustment control.

Further, at least one of an external controller or at least one controller of the plurality of building fixtures is operative to track (for example, along a path 1540) a location of a first mobile device 1530. FIG. 15 shows a possible path of locations of the first mobile device 1530 within the structure

1000. Several different methods of determining the location of the first mobile device 1530 through the use of the building fixtures have been described, and any one of the location determination methods can be utilized for tracking the locations of the first mobile device 1530.

Further, at least one of an external controller 1575 or at least one controller of the plurality of building fixtures 1510, 1511, 1412, 1513, 1514, 1515 is operative to identify the first mobile device 1530 being within a threshold distance of a second mobile device 1560 or a physical place 1561. Boundaries 1572, 1574 indicate possible threshold distances around the second mobile device 1560 or the physical place 1561. The threshold distances are shown in FIG. 15 as the same for both the second mobile device 1560 and the physical place 1561. However, clearly the threshold distances can vary between devices and places, and further, can vary with time.

Exemplary second mobile devices 1560 include tablets, mobile phones, laptops, asset tags, head mounted displays, and access badges.

Exemplary physical places 1561 include rooms or areas of a building, entry/exit points, workspaces, waypoints (for example self-guided tour stations, or emergency exit paths), locations of office equipment (for example, printers, coffee machines, appliances), and facility equipment (for example, plumbing fixtures, light fixtures, heating/cooling vents).

For at least some embodiments, the threshold distance is selected based on at least one of user preferences, mobile device velocity, information type, time of day, and controller analysis based on other factors (for example, widen (increase) the threshold distance if it is determined that users (such as, the first mobile device 1530) are not responding to alerts on a nearby sale). Further, the threshold distance can vary from device to device (both the first mobile device 1530 and the second mobile device 1560), and from physical place to physical place.

Further, at least one of an external controller or at least one controller of the plurality of building fixtures 1510, 1511, 1412, 1513, 1514, 1515 is operative to allow the first mobile device 1530 or a user of the first mobile device 1530 to receive information associated with the second mobile device or the physical place, or to provide information to be associated with the second mobile device 1560 or the physical place 1561 upon identifying the first mobile device 1530 to be within the threshold distance of the second mobile device 1560 or the physical place 1561.

For at least some embodiments, the information includes one or more of navigation information, conference room reservation data, conference room occupancy data, maintenance data (for example, coffee machine is broken, service appointment scheduled), alert at an employee's desk (for example, home sick today, contact me at this number), training data for new employees that is provided for a limited time after hire, facility tour information for non-employee, environmental control preferences, identity and location of users (which can include varying level of precision (such as, a specific location, what floor someone is on, or what building someone is in)), alerts and messages containing arbitrary information, user manuals, usage logs, maintenance logs or other documents associated with a device or place.

Information associated with the second mobile device 1560 or the physical place 1561 received by the first mobile device 1530 includes, for example, navigation information, conference room reservation data, conference room occupancy data, maintenance data (for example, coffee machine is broken, service appointment scheduled), alert at an employee's desk (for example, home sick today, contact me at this number), training data for new employees that is provided for a limited time after hire, facility tour information for non-employee, environmental control preferences, identity and location of users (which can include varying level of precision (such as, a specific location, what floor someone is on, or what building someone is in)), alerts and messages containing arbitrary information, user manuals, usage logs, maintenance logs or other documents associated with a device or place.

For at least some embodiments, at least one of the external controller 1575 or the at least one controller of the plurality of building fixtures 1510, 1511, 1412, 1513, 1514, 1515 is operative to send alerts to the first mobile device 1530 or the user 1531 of the first mobile device 1530 relevant to a location of the first mobile device 1530. For example, in an emergency, the controller (that is, the one or more controllers) can send navigation information to the first mobile device 1530 leading to the nearest safe emergency exit. Additionally, the first mobile device can receive alerts information about desired resources. For example, the controller can alert the first mobile device 1530 with the locations of the nearest conference rooms available. The controller can send maintenance data about nearby equipment as an alert to the first mobile data. For example, when the first mobile device 1530 is within the threshold distance of a broken coffee machine, the controller can send an alert notifying the user that the machine is not functional and route to a nearby alternative machine. Additionally, the alert can include maintenance information like the estimated time of repair or the time of the next service appointment. The controller can also alert the first mobile device with information at an employee's desk or workspace. For example, when the first mobile device 1530 is within the threshold distance from an employee's desk, the controller can alert the first mobile device that the employee is home sick or away at the moment. Additionally, the controller can provide additional information like a contact number or estimated date/time of return. Other information includes, for example, training data for new employees that is provided for a limited time after hire, facility tour information for non-employee, navigation information to the closest empty parking spot or empty desk.

For at least some embodiments, at least one of the external controller 1575 or the at least one controller of the plurality of building fixtures 1510, 1511, 1412, 1513, 1514, 1515 is operative to authenticate the first mobile device 1530 or the user of the first mobile device 1530 upon identifying the first mobile device 1530 to be within the threshold distance of the second mobile device 1560 or the physical place 1561. For an embodiment, authentication includes validating one or more items associated with the user or the user's device (such as, the first mobile device 1530). For at least some embodiments, the one or more items associated with the user or the user's device includes a password, certificates, an asymmetric key pair, a passcode sent to the user's device at time of authentication, or biometric data. For at least some embodiments, the one or more items associated with the user or the user's device includes external data to validate presence at the location at the given time, such as, images from camera, biometric data reader, badging system, or human feedback. For at least some embodiments, the one or more items associated with the user or the user's device provides for duplicate identity detection. For example, if a user or user's device is in two places at the same time, authentication fails. For at least some embodiments, the one or more items associated with the user or the user's device provides for validation of current location based on past locations and travel time. This includes, for example, identifying that user or user's device cannot have traveled a path in the time observed (compare travel time to acceptable velocities).

For an embodiment, the authentication allows for determination of authorization of the first mobile device 1530 to access a present location of the first mobile device 1530. Once the identity of a user or user's mobile device is determined, for an embodiment, the external controller or the at least one controller looks up a list of authorized and/or unauthorized locations for that user or mobile device. If unauthorized, for an embodiment, the controller or the at least one controller notifies personnel or activate security devices, etc. For an embodiment, the external controller or the at least one controller, denies authorization if the user or the user's device hasn't visited a specific location previously. For example, access to a clean room can be denied if the user has not gone through the clean room prep area. Alternatively, access to a first room can be denied if the user has previously gone through a second room or area.

For an embodiment, the authentication allows for determination of authorization of the first mobile device 1530 to access or provide information associated with the second mobile device 1560 or the physical place 1561.

Once the identity of a user or user's mobile device is determined, for an embodiment, the external controller or the at least one controller looks up whether the user or user's mobile device is authorized to receive or provide information by referring to an access control list (ACL). When attempting to receive information, for an embodiment, the information associated with an ACL indicates which users or the users' device are allowed and or disallowed to access the information. The users or users' devices can be described by the user or device's identity (for example, username or device MAC address) or attributes of the user/device including group membership, relationship to second user or mobile device (e.g. friend status), demographic information, user or device's status (for example, busy, do not disturb, available), etc. When attempting to provide information, for an embodiment, the ACL is associated with the second mobile device or physical place. Furthermore, the ACLs express the types of information that the first mobile device can provide. For example, the first mobile device 1530 might be permitted to provide alerts and messages, but not provide documents or files to the second mobile device or physical place.

For at least some embodiments, at least one of the external controller 1575 or the at least one controller of the plurality of building fixtures 1510, 1511, 1412, 1513, 1514, 1515 is operative to allow the first mobile device 1530 or the user of the first mobile 1530 to create alert data connected to a particular location and specify a user or group of users to receive the alert data when at least one mobile device of the user or the group of users is within the threshold distance of the particular location. For an embodiment, at least one of the external controller 1575 or the at least one controller of the plurality of building fixtures 1510, 1511, 1412, 1513, 1514, 1515 is operative to use a time period data for the alert data, or the threshold distance around the particular location where the alert data is relevant.

For at least some embodiments, the time period data for alerts includes time sensitive alerts. For example, the time sensitive alerts can include a notice, such as, boarding starts at 10:00 pm for flight XX314. Other time sensitive alerts include, for example, a user of the first mobile device 1530 leaving an alert in her office indicating she'll be gone for 2 hours and that it can be used for private phone calls while she's away. She can, for example, set the time period for the alert to 2 hours. Other time sensitive alerts include, for example, a shop owner sending an alert for a deal which is valid for the next 4 hours, and sets the time period data to 4 hours.

For at least some embodiments, the threshold distance around the particular location where the alert data is relevant includes distance sensitive alerts. For example, one distance sensitive alert includes a facilities manager sending alert for anyone in the east wing of building that conference rooms are being renovated and are not available. For example, one distance sensitive alert includes a shop owner sending alerts for anyone within 100 feet of the shop of current deals. For example, one distance sensitive alert includes an employee sending alerts to anyone in his department's area seeking lunch companions.

At least some embodiments include time and distance sensitive alerts (that use both a time period and distance threshold). For an embodiment, the distance threshold increases with time. For example, shop owners may send deal alerts using a small threshold distance (below and initial distance) to begin with, but as time progresses, the threshold distance widens (to above and later threshold) to cover more area. Further, for example, an employee sends alert asking for assistance with a small distance to begin with, but distance increases over time to increase chances of getting help.

For at least some embodiments, at least one of the external controller 1575 or the at least one controller of the plurality of building fixtures 1510, 1511, 1412, 1513, 1514, 1515 is operative to automatically control local environment and resources to conform to a user location and user preferences. The user preference can include personal environmental preferences, such as, configuration of lighting, temperature, blinds, or other ergonomic configurations such as desk and chair parameters. local environment controls include, for example, automatic configuration of a temporary workspace: phone number, shipping and receiving, printer preference, company directory modifications for employee location.

For at least some embodiments, at least one of the external controller 1575 or the at least one controller of the plurality of building fixtures 1510, 1511, 1412, 1513, 1514, 1515 is operative to validate an identity of the first mobile device 1530 or a user of the first mobile device 1530, and track the first mobile device 1530 or the user of the first mobile device 1520, and provide or deny access to one or more areas based on credentials of the first mobile device 1530. The parameters and configuration described for authorization can also be used to validate an identity. For at least some embodiments, the validation is used for allowing entry into a building, and/or entry into storage or maintenance areas.

For at least some embodiments, at least one of the external controller 1575 or the at least one controller of the plurality of building fixtures 1510, 1511, 1412, 1513, 1514, 1515 is operative to track locations of a plurality of other mobile devices (such as, the second mobile device 1560), and provide alerts to the first mobile device 1530 based upon the location of the first mobile device 1530 and locations of one or more of the other mobile devices. This includes, for example, searching for another person (another user and/or another user device) and displaying their location. For an embodiment, displaying the location of other user or user device can be more general, such as, by displaying as currently in a particular building. An embodiment includes consulting calendar events to alerting meeting attendees about navigation to conference rooms and an expected travel time to meeting location. An embodiment includes alerting meeting attendees if required attendee is not within range of the meeting. An embodiment includes finding a closest person (by tracking, for example, the second mobile device 1561) from a particular team, such as, a janitor, a maintenance person, a security guard, or administrative assistant.

For at least some embodiments, at least one of the external controller 1575 or the at least one controller of the plurality of building fixtures 1510, 1511, 1412, 1513, 1514, 1515 is operative to record past behavior of the first mobile device 1530, predict future locations of the first mobile device 1530, and send alerts based on the recorded past behavior or calendar information. For example, a user may usually get coffee shortly after arriving in the building, but the coffee machine is being repaired. An alert may be provided to indicate to the user (through the user's mobile device) to stop on the way for coffee, or to come in after the maintenance of the coffee machine is scheduled. An embodiment includes tracking that a user usually goes to the company café for lunch at noon, but it is unusually crowded, and providing an alert recommending the user to altering his schedule.

For at least some embodiments, at least one of the external controller 1575 or the at least one controller of the plurality of building fixtures 1510, 1511, 1412, 1513, 1514, 1515 is operative to allow the first mobile device or the user to subscribe to particular categories of location based alerts. For an embodiment, subscription to particular categories of location base alerts includes the first mobile device 1530 or a user of the first mobile device 1530 being allowed to request alerts (subscription) about the location of other users/devices. For example, a user of a first mobile device 1530 can request to be informed with a guest (user of a second mobile device 1560) arrives at a location. For another example, a camera (for example, a first mobile device 1530) can ask for notification of unauthorized users in an area (turn on when someone violates access rules).

Further, the first mobile device 1530 or a user of the first mobile device 1530 can unsubscribe from alerts as well. For example, a user may indicate that the use does not care about local specials at Acme Co., or that the user can request not to be informed (alerted) when the coffee machine is broken.

For at least some embodiments, at least one of the external controller 1575 or the at least one controller of the plurality of building fixtures 1510, 1511, 1412, 1513, 1514, 1515 is operative to send messages to individuals or groups of people based on a current location of the individuals or groups of people. Such location based messaging includes, for example, sending a message to anyone who is within 100 ft of me, or on the same floor. Further, feedback can be collected on how many users got the message, but let receivers (for example, second mobile device) decide whether sender (for example, the first mobile device) gets to know that receivers are in proximity. For example, a message can be sent to the closest janitor, maintenance person, security guard, administrative assistant. A message can be sent requesting "who wants lunch" based on the location (proximity) of the users. Messages can be sent to specific groups of users. That is, a message of "anyone from engineering around?".

Figure 16:
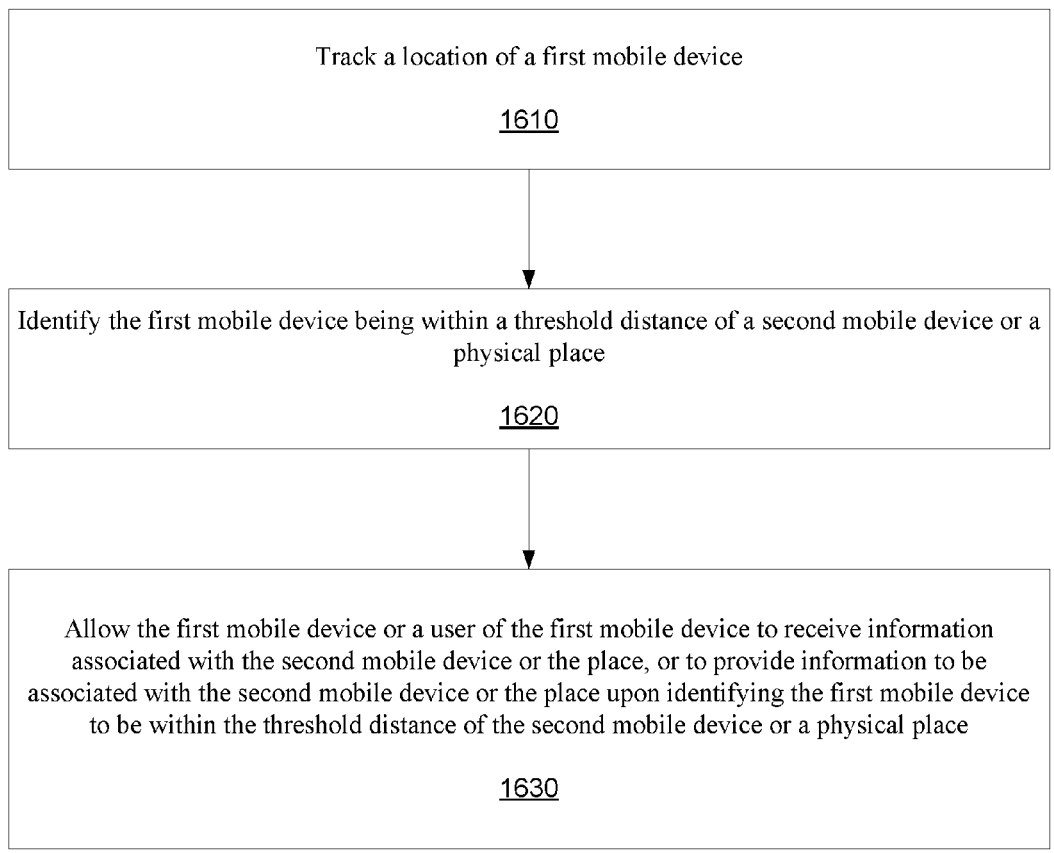
FIG. 16 shows a flow chart that includes steps of an external controller or at least one controller of the plurality of building control fixtures, according to an embodiment.

FIG. 16 shows a flow chart that includes steps of an external controller or at least one controller of the plurality of building control fixtures, according to an embodiment. A first step 1610 includes tracking a location of a first mobile device. A second step 1620 includes identifying the first mobile device being within a threshold distance of a second mobile device or a physical place. A third step 1630 includes allowing the first mobile device or a user of the first mobile device to receive information associated with the second mobile device or the physical place, or to provide information to be associated with the second mobile device or the place upon identifying the first mobile device to be within the threshold distance of the second mobile device or the physical place.

Although specific embodiments have been described and illustrated, the described embodiments are not to be limited to the specific forms or arrangements of parts so described and illustrated. The embodiments are limited only by the appended claims.

What is claimed:

1. A system operative to associate information with an asset or a physical space, comprising:
   a plurality of building control fixtures located within a structure, one or more of the plurality of building control fixtures comprising:
      a sensor unit, wherein the sensor unit generates a sense signal based on sensed motion; wherein
   the sensor unit comprises;
      communication circuitry, the communication circuitry operative to maintain a link with a network;
      a controller, the controller operative to:
         manage communication with the network, wherein the communication comprises at least information of the sense signal; and wherein
      wherein at least one of an external controller or at least one controller of the plurality of building control fixtures is operative to:
         track locations of a first mobile device within the structure based on locations of the plurality of building control fixtures, based on received signal strength of beacons communicated between the sensor unit and the first mobile device, and based on the sensed motion, wherein the tracked locations include location estimates, wherein new location estimates based on the beacons that correspond with a location in which a building control fixture has not sensed motion are given a lower probability estimate compared to a location in which a building control fixture has sensed motion;
         identify the first mobile device being within a threshold distance of a physical place based on the tracked locations of the first mobile device and a location of the physical space; and
         allow the first mobile device or a user of the first mobile device to receive information associated with the physical place, or to provide information to be associated with the physical place upon identifying the first mobile device to be within the threshold distance of the physical place.

2. The system of claim 1, wherein the at least one of the external controller or the at least one controller of the plurality of building control fixtures is further operative to send alerts to the first mobile device or the user of the first mobile device relevant to a location of the first mobile device.

3. The system of claim 1, wherein the at least one of the external controller or the at least one controller of the plurality of building control fixtures is further operative to authenticate the first mobile device or the user of the first mobile device upon identifying the first mobile device to be within the threshold distance of the physical place.

4. The system of claim 3, wherein authentication allows for determination of authorization of the first mobile device to access a present location of the first mobile device.

5. The system of claim 3, wherein authentication allows for determination of authorization of the first mobile device to access or provide information associated with the physical place.

6. The system of claim 1, wherein the at least one of the external controller or the at least one controller of the plurality of building control fixtures is further operative to allow the first mobile device or the user of the first mobile to create alert data connected to a particular location and specify a user or group of users to receive the alert data when at least one mobile device of the user or the group of users is within the threshold distance of the particular location.

7. The system of claim 6, wherein the at least one of the external controller or the at least one controller of the plurality of building control fixtures is further operative to use a time period data for the alert data, or the threshold distance around the particular location where the alert data is relevant.

8. The system of claim 1, wherein the at least one of the external controller or the at least one controller of the plurality of building control fixtures is further operative to automatically control local environment and resources to conform to a user location and user preferences.

9. The system of claim 1, wherein the at least one of the external controller or the at least one controller of the plurality of building control fixtures is further operative to validate an identity of the first mobile device or a user of the first mobile device, and track the first mobile device or the user of the first mobile device, and provide or deny access to one or more areas based on credentials of the first mobile device.

10. The system of claim 1, wherein the at least one of the external controller or the at least one controller of the plurality of building control fixtures is further operative to track locations of a plurality of other mobile devices, and provide alerts to the first mobile device based upon the location of the mobile device and locations of one or more of the other mobile devices.

11. The system of claim 1, wherein the at least one of the external controller or the at least one controller of the plurality of building control fixtures is further operative to record past behavior of the first mobile device, predict future locations of the first device and alerts based on the recorded past behavior or calendar information.

12. The system of claim 1, wherein the at least one of the external controller or the at least one controller of the plurality of building control fixtures is further operative to allow the first mobile device or the user to subscribe to particular categories of location based alerts.

13. The system of claim 1, wherein the at least one of the external controller or the at least one controller of the plurality of building control fixtures is further operative to send messages to individuals or groups of people based on a current location of the individuals or groups of people.

14. The system of claim 1, wherein the controller comprises a light controller and an environmental parameter controlled by the light controller comprises a light intensity.

15. The system of claim 1, wherein tracking locations of the first mobile device within the structure based on beacons communicated between the sensor unit and the first mobile device includes at least one of the plurality of building control fixtures operating to:
  transmit wireless downlink beacons to the first mobile device, wherein a different transmission protocol is used for the transmitted wireless downlink beacons to the first mobile device than for received beacons received from the first mobile device through wireless communication circuitry of the at least one of the plurality of building control fixtures;
  estimate a distance between the at least one of the plurality of building control fixtures and the first mobile device based on an RSSI of the received beacons, the transmission power of the beacons from the mobile device, and based on a received signal power of the downlink beacons received at the first mobile device; and
  estimate a location of the first mobile device based on the estimated distance.

16. A method of operating a building control fixture located within a structure comprising:
  generating, by a sensor of the building control fixture, a sense signal based on sensed motion;
  maintaining a communications link between the building control fixture and a network;
  managing communication with the network, wherein the communication comprises at least information of the sense signal;
  tracking locations of a first mobile device within the structure based on locations of the plurality of building control fixtures, based on received signal strength of beacons communicated between the sensor unit and the first mobile device, and based on the sensed motion, wherein the tracked locations include location estimates, wherein new location estimates based on the beacons that correspond with a location in which a building control fixture has not sensed motion are given a lower probability estimate compared to a location in which a building control fixture has sensed motion;
  identifying the first mobile device being within a threshold distance of a physical place based on the tracked locations of the first mobile device and a location of the physical space; and
  allowing the first mobile device or a user of the first mobile device to receive information associated with the physical place, or to provide information to be associated with the physical place upon identifying the first mobile device to be within the threshold distance of the physical place.

17. The method of claim 16, further comprising sending alerts to the first mobile device or the user of the first mobile device relevant to a location of the first mobile device.

18. The method of claim 16, further comprising authenticating the first mobile device or the user of the first mobile device upon identifying the first mobile device to be within the threshold distance of the physical place.

19. The method of claim 18, wherein authentication allows for determination of authorization of the first mobile device to access a present location of the first mobile device.

20. The method of claim 18, wherein authentication allows for determination of authorization of the first mobile device to access or provide information associated with the physical place.

* * * * *